US006760748B1

(12) United States Patent
Hakim

(10) Patent No.: US 6,760,748 B1
(45) Date of Patent: Jul. 6, 2004

(54) INSTRUCTIONAL SYSTEM GROUPING STUDENT TERMINALS

(75) Inventor: Omar Besim Hakim, Dallas, TX (US)

(73) Assignee: Accenture LLP, Palo Alto, CA (US)

(*) Notice: Subject to any disclaimer, the term of this patent is extended or adjusted under 35 U.S.C. 154(b) by 0 days.

(21) Appl. No.: 09/234,338

(22) Filed: Jan. 20, 1999

(51) Int. Cl.[7] .............................................. G06F 13/00
(52) U.S. Cl. ...................... 709/204; 345/707; 345/708; 345/705; 434/350; 434/351; 717/178
(58) Field of Search ................................ 709/203, 204; 717/3, 176, 177, 178; 434/350, 351, 322; 345/705–715

(56) References Cited

U.S. PATENT DOCUMENTS

| 4,785,472 A | 11/1988 | Shapiro |
| 5,002,491 A | 3/1991 | Abrahamson et al. |
| 5,176,520 A | 1/1993 | Hamilton |
| 5,273,437 A | 12/1993 | Caldwell et al. ............. 434/351 |
| 5,303,042 A | 4/1994 | Lewis et al. |
| 5,537,141 A | 7/1996 | Harper et al. ................. 348/12 |
| 5,590,360 A | 12/1996 | Edwards |
| 5,712,906 A | 1/1998 | Grady et al. ............. 379/93.17 |
| 5,727,950 A * | 3/1998 | Cook et al. ................. 434/350 |
| 5,812,668 A | 9/1998 | Weber |
| 5,815,657 A | 9/1998 | Williams et al. |
| 5,833,468 A | 11/1998 | Guy et al. |

(List continued on next page.)

FOREIGN PATENT DOCUMENTS

| EP | 0697773 A3 | 2/1966 |
| EP | 0843432 A2 | 10/1997 |
| EP | 0869630 A2 | 10/1998 |
| GB | 2321120 A | 10/1997 |
| WO | WO96/03734 | 2/1996 |
| WO | WO98/39867 | 9/1998 |
| WO | WO00/14699 | 3/2000 |

OTHER PUBLICATIONS

M. Sheehan, "Thin Clients and Network–Centric Computing", Online, vol. 22(6), pp. 89–98, Nov./Dec. 1998.
G.S. Machovec, "Thin Client Architecture: the Promise and the Problems", Online Libraries and Microcomputers, Jan. 1997.

(List continued on next page.)

Primary Examiner—Kenneth R. Coulter
(74) Attorney, Agent, or Firm—Oppenheimer Wolff & Donnelly LLP

(57) ABSTRACT

An interactive electronic instructional system is a teaching interface between a teacher and students where data is transmitted from the teacher's terminal to the student terminals. The data is received at the student terminals and is separated into execution data and instructional data. The student terminals are grouped into teams allowing student teams to interact with a group decision. This encourages team participation by shy or otherwise reluctant students. Team answer data is transmitted from one of the student terminals in the team to the teacher's terminal. The teacher monitors team answer data to infer class progress towards a goal. The teacher may modify the instructional data based on the progress.

19 Claims, 20 Drawing Sheets

U.S. PATENT DOCUMENTS

| | | | |
|---|---|---|---|
| 6,125,363 A * | 9/2000 | Buzzeo et al. | 707/100 |
| 6,201,948 B1 * | 3/2001 | Cook et al. | 434/350 |
| 6,427,063 B1 * | 7/2002 | Cook et al. | 434/350 |
| 6,606,479 B2 * | 8/2003 | Cook et al. | 434/350 |

OTHER PUBLICATIONS

Scott E. Sampson, Gathering customer feedback via the Internet: instruments and prospects, Industrial Management & Data Systems, pp. 71–82, MCB University Press, [ISSN 0263–5577] Feb. 1998.

Jac–Hyun Lim, Hyon–Woo Seung, Jun Hwang, YoungChan Kim, & Heung–Nam Kim, "Query Expansion for Intelligent Information Retrieval On Internet," pp. 656–662; Proceedings of the 1997 International Conference on Parallel and Distributed Systems sponsored by Parallel Processing Systems SIG of Korea Information Science Society, IEEE, (Seoul, Korea) Dec. 10–13, 1997.

Keith L. Clark & Vasilions S. Lazarou, "A Multi–Agent System for Distributed Information Retrieval on the World Wide Web,"pp. 87–92, Proceedings/ Sixth IEEE Workshops on Enabling Technologies: Infrastructure for Collaborative Enterprises sponsored by IEEE Computer Society, CERC at West Virginia University, IEEE (MIT, Cambridge, Massachusetts) Jun. 18–20, 1997.

Chungnan Lee & Yao–tsung Chen, "An Embedded Visual Programming Interface for Intelligent Information Retrieval on the Web," pp. 46–53, Proceedings of the 1997 IEEE Knowledge and Data Engineering Exchange Workshop, sponsored by IEEE Computer Society of Los Alamitos California, (Newport Beach, California) Nov. 4, 1997.

Scott E. Sampson, "Employing Internet Technologies To Gather Customers' Quality Perceptions," pp. 1688–1690.

* cited by examiner

SE170009:
FIXES MEMORY LEAK IN THE PRINT SPOOLER

SE170013:
IMPROVES DOS APPLICATION PRINTER PIPING IMPLEMENTATION.

SE170019:
FIXES PROBLEM WHERE FILES IN MACINTOSH VOLUMES DISAPPEAR FROM MACINTOSH CLIENTS

SE170020:
FIXES 'BLUE SCREEN OF DEATH' PROBLEM ON NTFS SYSTEMS.

SE170023:
IMPROVES IMPLEMENTATION OF CONCURRENT USERS WITH MANDATORY PROFILES.

SE170024:
FIXES SITUATION WHERE CLIENTS THAT ATTEMPT TO PRINT WILL LOCK UP.

SE170029:
FIXES A PROBLEM WITH THE 'MESSENGER' SERVICE CAUSING DR. WATSON ERRORS.

SE170031:
FIXES OLE AUTOMATION.

SE170040:
FIXES CONTENTION ISSUE WITH 'CLIPBOARD'.

SE170041:
IMPROVES IMPLEMENTATION OF PRINTER AUTOCREATION.

SE170045:
FIXES PROBLEMS WITH USER MANAGER FOR DOMAINS, WITH LOAD BALANCING.

SE170046:
FIXES PROBLEMS WITH 'WINSTATION ADMINISTRATION' UTILITY.

SE170047:
FIXES PROBLEMS WITH 'APPLICATION CONFIGURATION' UTILITY.

SE170061:
FIXES PROBLEMS WITH 16-BIT APPLICATIONS.

FIG. 3

| PROFILE ROOT NAME | PHYSICAL LOCATION | PRINTER(S) ATTACHED | APPLICATIONS |
|---|---|---|---|
| PRE_K | | | |
| KINDERGARTEN | | | INTERNET EXPLORER |
| 1ST_GRADE | | | |
| 2ND_GRADE | | | |
| 3RD_GRADE | | | |
| 4TH_GRADE | | | |
| 5TH_GRADE | | | |
| 6TH_GRADE | | | |
| TEACHERS | | | |
| HEADMASTER | | | |
| SECRETARY | | | |

FIG. 4

| | | |
|---|---|---|
| TCP/IP | IP ADDRESS | |
| | BOOTP ADDRESS | N/A |
| | TELNET ACCESS? | YES |
| | TELNET PASSWORD | |
| | HTTP ACCESS? | YES |
| | HTTP USERID | |
| FILTER | FIXED NODES? | YES |
| | IP/ARP? | NO |
| | IPX LSP? | YES |
| | NetBEUI? | NO |
| | DECNet? | YES |
| | APPLETALK? | YES |
| | BROADCAST BANDWIDTH ALLOCATION % | 100 |
| BRIDGE | AGING PERIOD | 300 |
| | FORWARDING DATABASE FULL TRAP % | 100 |
| RADIO | CHANNEL | 2 |
| | SUBCHANNEL | 1 |
| | DOMAIN | 3 |
| | NAME | GYM |
| | REPEATING? | NO |
| | DELAY RADIO CONFIGURE? | NO |
| | RADIO SATURATED TRAP% | 100 |
| | RADIO BROADCAST SATURATED TRAP % | 100 |
| | SecurityID | |
| | AUTHORIZATION TABLE USED? | YES |
| | ACCEPT DOWNLOAD FROM OTHER APS? | YES |

FIG. 5

| TCP/IP | IP ADDRESS | |
| --- | --- | --- |
| | SUBNET MASK | |
| | DEFAULT GATEWAY | |
| | TELNET PASSWORD | |
| | HTTP ACCESS? | YES |
| | HTTP PASSWORD? | |
| FILTER | FIXED NODES? | YES |
| | IP/ARP? | NO |
| | NetBEUI? | NO |
| | DECNet? | YES |
| | APPLETALK? | YES |
| | OTHER? | NO |
| | BROADCAST BANDWIDTH ALLOCATION % | 100 |
| BRIDGE | AGING PERIOD | 300 |
| | FORWARDING DATABASE FULL TRAP % | 100 |
| RADIO | CHANNEL | 3 |
| | SUBCHANNEL | 1 |
| | DOMAIN | 3 |
| | MAC OPTIMIZE | AUTOMATIC |
| | NO TRAFFIC TRAP PERIOD | 0 |
| | RADIO BROADCAST SATURATED TRAP % | 100 |
| SecurityID | SecurityID | |
| | AUTHORIZATION TABLE USED? | YES |
| | ACCEPT DOWNLOAD FROM OTHER APS? | YES |

FIG. 6

| TCP/IP | IP ADDRESS | |
|---|---|---|
| | SUBNET MASK | |
| | DEFAULT GATEWAY | |
| | BOOTP? | FALSE |
| | BOOTP ADDRESS | N/A |
| | IPX RIP? | YES |
| | IPX LSP? | YES |
| | NetBEUI? | NO |
| | DECNet? | YES |
| | APPLETALK? | YES |
| | OTHER? | NO |
| | BROADCAST BANDWIDTH ALLOCATION % | 100 |
| BRIDGE | AGING PERIOD | 300 |
| | FORWARDING DATABASE FULL TRAP % | 100 |
| RADIO | CHANNEL | 4 |
| | SUBCHANNEL | 1 |
| | DOMAIN | 4 |
| | REPEATING? | NO |
| | NO TRAFFIC TRAP PERIOD | 0 |
| | RADIO SATURATED TRAP % | 100 |
| | RADIO BROADCAST SATURATED TRAP % | 100 |
| | SecurityID | |
| | AUTHORIZATION TABLE USED? | YES |
| | ACCEPT DOWNLOAD FROM OTHER APS? | YES |

FIG. 7

| MAC LEVEL OPTIMIZATION | # OF STATIONS SYNCHED | # OF SLOTS |
|---|---|---|
| LOW |  | 2 |
| MEDIUM |  | 4 |
| HIGH |  | 8 |
| AUTO | 2 OR LESS | 2 |
|  | 4 OR LESS | 4 |
|  | MORE THAN 4 | 8 |

FIG. 8

| | STANDARD BROWSER CAPABILITIES | CUSTOM BROWSER CAPABILITIES | IWS CHILDPROOF | STANDARD PROXY SERVER |
|---|---|---|---|---|
| LOW COST | ○ | ◐ | ◐ | ◐ |
| THIN-CLIENT FRIENDLY | ◐ | ◐ | ● | ◐ |
| TRANSPARENT | ○ | ○ | ◐ | ◐ |
| SCALABLE | ◐ | ◐ | ○ | ○ |
| CONTENT FILTERING | ◐ | ○ | ○ | ◐ |
| VARIABLE ACCESS LEVELS | ○ | ○ | ● | ○ |
| CONTENT CACHING | ◐ | ◐ | ● | ◐ |
| MONITORING AND REPORTING | ● | ● | ● | ○ |
| FAULT-TOLERANCE | ◐ | ◐ | ◐ | ◐ |
| CUSTOMIZATION POTENTIAL | ◐ | ● | ● | ◐ |
| OVERALL | ○ | ○ | ◐ | ◐ |

FIG. 9

|  | ANALOG DIAL-UP | ISDN DIAL-UP | CABLE MODEM | XDSL | INTERNET | INTERNET (WITH VPN) |
|---|---|---|---|---|---|---|
| LOW COST | ◐ | ○ | ○ | ● | ○ | ◐ |
| THIN-CLIENT FRIENDLY | ○ | ◐ | ◐ | ◐ | ○ | ○ |
| TRANSPARENT | ○ | ◐ | ◐ | ◐ | ○ | ○ |
| SCALABLE | ◐ | ○ | ○ | ○ | ◐ | ◐ |
| "UNIVERSAL" AVAILABILITY | ◐ | ○ | ◐ | ◐ | ◐ | ◐ |
| SECURITY | ○ | ◐ | ○ | ◐ | ◐ | ◐ |
| OVERALL | ◐ | ○ | ○ | ◐ | ○ | ◐ |

FIG. 10

|  | STANDARD THIN CLIENTS | THIN CLIENTS + OUT OF BAND VIDEO DISTRIBUTION | LOCALLY SERVED THIN CLIENTS (DirectICA) | THICK MULTIMEDIA WORKSTATIONS |
|---|---|---|---|---|
| LOW COST | O | ◐ | O | O |
| THIN-CLIENT FRIENDLY | O | O | ◐ | ● |
| TRANSPARENT | O | ● | O | ◐ |
| SCALABLE | O | ◐ | O | O |
| MULTIMEDIA RICH INTERNET | O | O | O | O |
| MULTIMEDIA RICH APPLICATIONS | ◐ | ◐ | O | O |
| VIDEO | ● | ◐ | O | O |
| DISTANCE LEARNING | ● | ◐ | ◐ | O |
| OVERALL | ◐ | ◐ | ◐ | O |

FIG. 11

| OSI MODEL LAYER | WLAN SECURITY MEASURES |
|---|---|
| PHYSICAL | SPREAD SPECTRUM<br><br>20 BIT SYNCHRONIZATION SIGNAL<br><br>ENCODING |
| DATA LINK | MAC ADDRESS FILTERING |
| NETWORK | ADDITIONAL SECURITY |
| TRANSPORT | PROVIDED BY NETWORK |
| SESSION | DEVICES, |
| APPLICATION | OPERATING SYSTEM, AND |
| PRESENTATION | APPLICATION |

FIG. 12

INSTRUCTIONAL SYSTEM GROUPING STUDENT TERMINALS

FIELD OF THE INVENTION

The present invention relates to instructional systems for industrial environments and more particularly to a thin client solution for deploying educational systems utilizing existing computer and communication infrastructure.

BACKGROUND OF THE INVENTION

Many industrial environments have a requirement for deploying information through a computing medium without replacing computer and networking hardware. This need is perhaps greatest felt in manufacturing facilities striving for flexibility and classrooms where environmental considerations and budget constraints dictate the reuse of existing networking and computer equipment. IBM and Apple have been very active in this marketplace offering various educational solutions that utilize CD ROM technology to provide effective multimedia educational platforms for schools and factories.

The present invention relates to a computer-based teaching system employing networking and computer assisted interactive techniques for enhancing a teacher's efficiency and effectiveness in a classroom. As will be discussed below, among its various attributes, the inventive system enables a teacher:

(1) to monitor progress of a class more closely during each classroom session, and over each section of a course, than has been possible in the past;

(2) to stimulate active participation by all students in a class;

(3) to automate rollkeeping and the giving and grading of quizzes and homework; and (4) to utilize instructional videos and associated peripheral hardware interactively with the system. The invention thus integrates computers into the mainstream of the learning and grading process at educational institutions, with significant benefit to the classroom environment, including facilitated knowledge of student performance, and associated savings in routine paperwork.

There have been numerous techniques devised for enabling a teacher to more easily convey information and understanding to a class, and ultimately to relieve the teacher, to the greatest extent possible, of a number of the burdens associated with conveying that information to the class. Various electronically-based techniques have been implemented, but these have proved to be quite limiting or otherwise disadvantageous. In one sense, the techniques have been limiting in that interaction between the student and the teacher may be limited to responses to multiple-choice type questions, or to questions requiring only numerical answers. Examples of such systems include those described in U.S. Pat. Nos. 3,656,243; 3,694,935; 3,716,929; 4,004,354; 4,785,472; 5,002,491; 5,176,520; 5,303,042; 5,590,360; 5,812,668; and 5,815,657. Such systems have been further limiting in that they have not provided any way of keeping accurate, detailed records for individual students for the duration of a given class.

Other more recently-proposed systems have taken advantage of advances in technology to interconnect a number of students in the same classroom, or in different classrooms, for purposes of gathering information, or facilitating access to instructional programs. One example is U.S. Pat. No. 4,636,174, which enables students to download instructional programs from a central computer, which acts as a sort of file server. In this system, the student, rather than the teacher, has control over system access and operation.

Another example is U.S. Pat. No. 4,759,717, which discloses detailed networking structure for connecting conventional personal computers. However, there is at most only limited teacher-student interaction contemplated. Rather, this system is directed more toward providing, at a central location, an instructional program which may be downloaded locally so that students can learn various types of computer programs. Yet another example of a conventional student response system is U.S. Pat. No. 4,764,120. This system is intended to collect data of a limited nature (e.g., responses to multiple-choice questions) from a number of classrooms. There is no provision of statistical analysis to inform the teacher of how well a class is learning the concepts being conveyed. This feature also is absent from the other two just-mentioned U.S. patents.

One of the important services an electronically-based classroom teaching system can provide is to enable a teacher to monitor progress of the class and of individual students, and to focus effort in areas where students seem to have the most trouble understanding the concepts being taught. An electronic classroom teaching aid also should assist a teacher in breaking through the reluctance that students have to participating actively in class. Some of this reluctance derives from basic shyness, or fear of seeming different, or fear of seeming superior (or less intelligent, for that matter). Enabling students to respond individually and confidentially by electronic means to questions posed by the teacher can help to break through some of the shyness or reluctance a student otherwise may exhibit.

However, this confidentiality by itself does not suffice to satisfy all students, at all levels, in all teaching situations. Sometimes active participation and motivation can be encouraged better by combining students in small teams (by twos or threes) and requiring that they respond to questions as a team. In this way, students can learn from the insights and difficulties of their peers. The teacher can infer class progress from the responses of the teams. In still other situations it is important to enable students to proceed, if possible, in a self-paced manner, to learn concepts conveyed in the classroom, while still having the teacher present to monitor the situation and to concentrate in areas where the class seems to be having difficulty. Here, it is important that the interactive electronic classroom system advise the teacher, as soon as possible, what percentage of the class grasps the concepts being taught. Certain of the above-mentioned U.S. patents, such as U.S. Pat. No. 4,004,354, describe systems which provide the teacher with a readout of the percentage of students answering a question correctly. However, the types of questions still are limited to multiple choice, and do not provide a vehicle for further discussion and exploration of concepts which appear to be difficult to grasp.

It is desirable to have a system in which students could respond to a wider range of questions, with different types of responses required (for example, a narrative response of limited length). It also is desirable to enable a student to take a quiz at his or her own pace, with questions requiring answers other than multiple choice or simple numerical answers. Further, it is desirable for students to be able to run short didactic programs which are designed to enable students to experiment immediately and actively with the concepts which are being taught in that class, and which simultaneously give feedback to the teacher. Those students who have succeeded in a task may be assigned more advanced work while others may receive remedial instruction. It follows that different portions of a class should be able to work at one time, on different tasks, under control and supervision of the teacher. Such a system would be in complete contrast to conventional computer-based instruction which has tended to have the effect of replacing, rather than assisting teachers.

In summary, it is desirable to have a system which provides networked deployment of instructional information without replacing existing computer and communication infrastructure.

SUMMARY OF THE INVENTION

In view of the foregoing, it is an object of the present invention to provide a computer-based, networked electronic classroom system in which the teacher can monitor class progress, ask questions including those requiring narrative or other more complicated responses, and generally focus efforts in areas where more instruction appears to be needed. It also is an object of the invention to provide classroom facilities for students to perform computer based instructional exercises, run didactic software and simulations, and compete as groups in games or other computer based instructional activities under the close direction and supervision of the teacher, while retaining the benefits of individual feedback associated with single user stand-alone systems.

It is another object of the invention to provide facilities for fully or partially automating the giving and grading of quizzes, class attendance, rollkeeping, grading of homework and other routine paperwork associated with monitoring student progress and recordkeeping. To accomplish these and other goals, the novel, inventive electronic classroom herein described includes a central computer and display at the teacher's desk, a plurality of terminals at desks of individual students and network connection between the central computer and the terminals. The terminals may range in complexity from a simple dedicated keypad with rudimentary display, to a hybrid version of a calculator/terminal with numeric and function keys, to a rudimentary hand-held computer with a full keyboard and single or multi-line display, having a number of other possible functions such as those of calculator, typewriter, organizer, appointment diary, phone directory, thesaurus, and dictionary, up to a full-fledged personal computer capable of operating in a stand-alone mode. The student terminals may be fixed in the classroom, or may be carried by students as portable devices with numerous possible ranges of applications outside a classroom context.

Thus, the inventive system encompasses a range of possible hardware and software embodiments, enabling a range of cost and functionality in its possible implementations. This range also is evident for permissible connections between the central computer and the student terminals. The network connection between the central computer and student terminals consist of a full local area network (LAN), enabling equal connectivity among all stations and any industry accepted physical topology, or (in the preferred embodiment) may consist of one of many possible lower cost network options with unequal connectivity where a special higher level protocol ensures that all messages from student terminals pass through the central computer or through a special network server connected directly to it.

Another component of the inventive system is an electronic display for displaying textual and graphic information for instructional purposes by a teacher to a class. As with other components, this display may take several forms. It may be a liquid crystal display which lies on top of an overhead projector and is driven by the display output from the central computer; it may be a projection video device which also is driven by a display output from the central computer. The information to be displayed may be divided into two categories. The first category consists of any instructional material, such as normally is displayed by teachers in conventional classrooms, and includes questions, directions, or activities. The second category includes student responses and statistical or graphic analyses (or other orderings, sortings or summaries) of the same. The display of all such information in both categories is under control of the teacher, who may view selectively such information privately on the central computer monitor before sending it out for viewing by the students.

Software and hardware that provide the following features are also provided: a communication protocol, associated with the central computer, the network and the plurality of student terminals, for allowing the transmission of command data from the central computer to one or more of the student terminals (selectively or collectively), for allowing the downloading of programs from the central computer to one or more of the student terminals in similar fashion, and for allowing the transmission of student responses or other data from the student terminals to the central computer; a timing environment, associated with the central computer software, the student terminals, and software operating on both the central computer and the student terminals, for allowing each of the terminals to proceed through a sequence of student tasks (those tasks consisting of one or a combination of questions, quizzes, tests, classroom exercises, didactic programs, instructional games, simulations, homework, and other instructional activities) either at each student's own pace, or in lockstep with all other students in the class. If the teacher assigns different tasks to different groups of students in the class, then students within each group may proceed either individually or in lockstep with others in that group, at the selection of the teacher. In all cases the responses would be transmitted and monitored by the central computer, with the teacher retaining control of the pacing of student tasks via the central computer; a command language, with an optional associated menu driven command language generator, for enabling an instructor to prepare a series of student tasks (as described above) prior to a classroom session, and for storing this information or subsequent retrieval and use, for example using non-volatile memory or removable media such as floppy discs; a control program, optionally utilizing menu driven facilities, for enabling a teacher during a class to enter a new student task, or to retrieve and view previously prepared student tasks which then may be executed; a log-on facility for students to identify themselves personally, and by classroom location, to the system; a database facility for storing information input to the system.

This information may be input by the teacher directly via the central computer, by the students via student terminals, by reading from removable storage media (such as floppy disks) or by other means (such as networking between a teacher's private computer and the electronic classroom system). The types of information which might be stored in the database would include class records, student rolls, questions, tests, or other tasks asked during each class, and student responses transmitted to the central computer. The actual repository may be fixed media within the central computer of the electronic classroom system, or it may be removable storage media which may be transferred between the classroom system and another computer outside the classroom (possibly the teacher's private computer). This transferal also may take place via a local area network between the central computer and other computers; presentation and analysis facilities to enable a teacher to view and analyze information gathered by the system. During a classroom session, these facilities would allow a teacher to view and analyze student data and responses. They also would permit the teacher selectively to show certain of these responses and analyses of such responses to the class via the electronic display. Outside a classroom session, probably on a separate computer (possibly, one located in a teacher's office), these facilities would allow a teacher to examine student responses further for a variety of purposes. Such purposes might include a search for weaknesses, or strengths, in areas of understanding for individual students, or for the class as a whole. The might include the tracking of progress of individual students, or the grouping of students with particular weaknesses or strengths. They may include assessments of attendance, class performance, homework performance, or the assignment of grades, possibly with automatic facilities for grading the various components of student performance to a selectable curve. They also may include facilities for directly transmitting student grades to administrative databases via a network.

The range of overall contexts in which the present invention may be installed and used is almost unlimited. However, emphasis on particular features of the system may vary from one context to another. For example, at the primary level there is likely to be more emphasis on the additional variety in activities provided by the system and its capability for instructional feedback to students and teacher. In addition to these factors, at the high school level automatic testing and record keeping become more important, since one teacher instructs many more students. Also, the diagnostic and early warning features become more significant. At the college level, with huge classes, all these features are important, and a professor is likely to have his or her own computer outside the classroom to assist with the preparation of materials and with data management. Thus, it would be desirable to have a flexible industrial communication and education system that could make use of existing hardware and software to deploy applications without requiring replacement of existing computer and networking environments.

DESCRIPTION OF THE DRAWINGS

The foregoing and other objects, aspects and advantages are better understood from the following detailed description of a preferred embodiment of the invention with reference to the drawings, in which:

FIG. 3 presents a list of many of the WinFrame v1.7 English hot fixes in accordance with a preferred embodiment;

FIG. 4 is a user profile table in accordance with a preferred embodiment;

FIGS. 5 to 7 are system tables in accordance with a preferred embodiment;

FIG. 8 is a tabular display of the optimization level and synchronization in accordance with a preferred embodiment;

FIGS. 9 to 11 are various comparison matrixes of features in accordance with a preferred embodiment;

FIG. 12 is a table of various communication protocols in accordance with a preferred embodiment;

DETAILED DESCRIPTION

Figure 1:
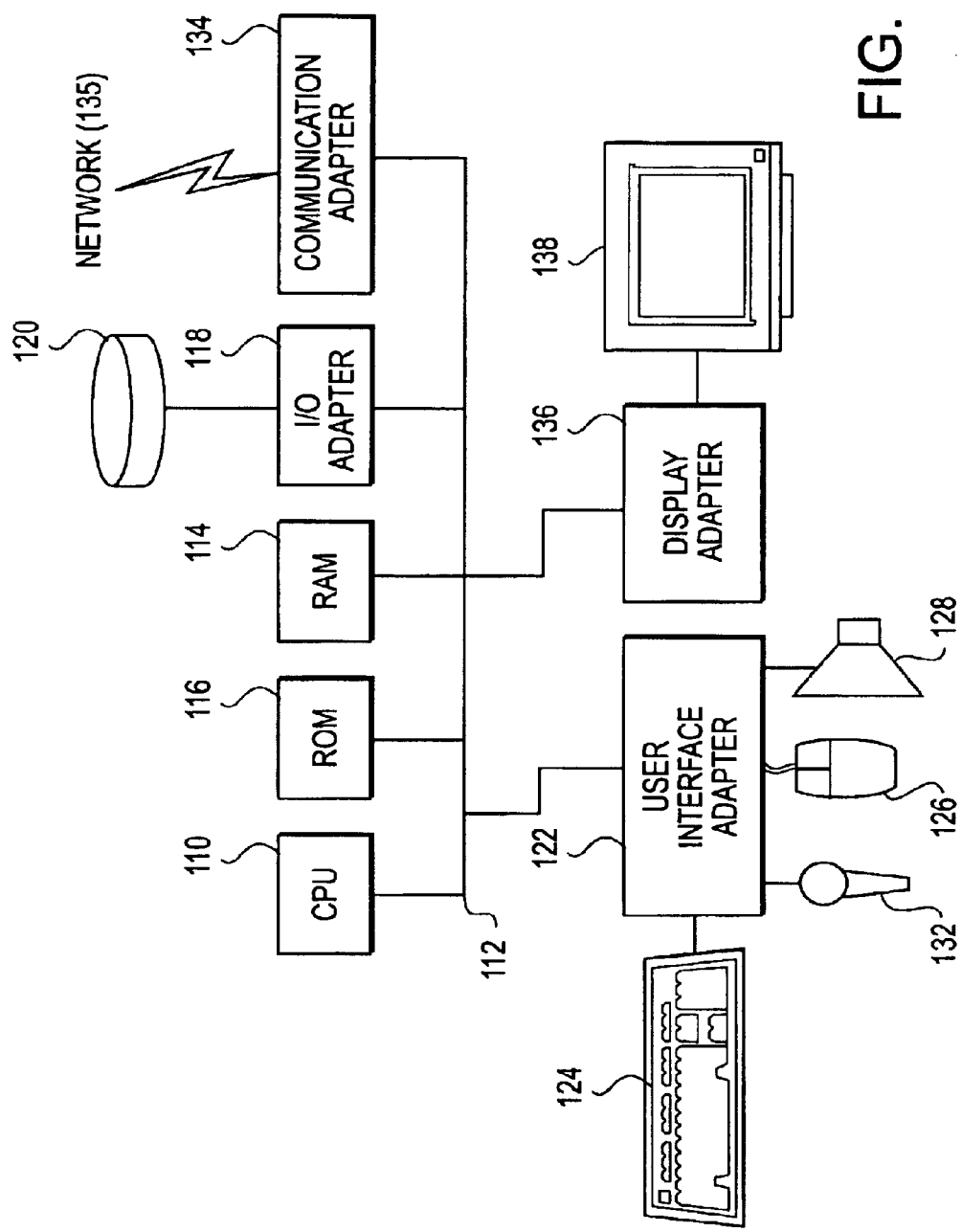
FIG. 1 is a block diagram of a representative hardware environment in accordance with a preferred embodiment.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 1, which illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP cap abilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1:HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed interpreted robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents:(e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Introduction

An Information Utility Solution in accordance with a preferred embodiment provides a fully-managed information technology infrastructure designed to meet the current and future Internet connectivity and computing needs of most industrial training centers. The system provides increased computing capabilities and continuing access to technology at lower cost with lower risk.

A preferred embodiment of the solution will be presented utilizing a school education example (K-12), due to the large increase in federal and state funding and attention for information technology in the classroom. The solution will combine thin-client computing architecture, wireless LAN technology, centrally-managed data center operations and desktop outsourcing services to provide clients with an affordable, managed, high-performance desktop environment to almost any end-user device, including 286 PCs and Macintosh computers.

This Solution is both platform independent and operating system independent. Any application from any client and any form of operating system can be installed and used—including Macintosh and Apple II. End users can access the applications and content from either office terminals via LAN or from their home computers via direct dial up or website access via Internet browser.

The preferred embodiment can be configured to employ technology that will ensure that access to the Internet will be restricted to appropriate websites and content. Similar restrictions/access profiles will apply to the use of licensed premium training and educational content as well as computer applications.

The wireless LAN technology facilitates a cost-effective, cable-free installation of computing networks—particularly beneficial to those government entities which have buildings with asbestos contamination. Wireless LANs will also permit rapid installations. Finally, integrating the preferred embodiment architecture and technology will allow ServiceNet-like data centers to provide centralized network and application management—including the ability to remotely update client terminals and minimize LAN maintenance costs.

Management

Single point control for network management. The system can be deployed, managed and applications supported in minutes—not months—from one data center location. User profiles can be defined that are consistent across job categories for application and Internet access. Further, the technology will allow for the development of customized desktop environments for each employee.

Integrated Email, file and Web services.

Scalable solution which can support thousands of concurrent users.

Access

Universal application access that is platform and operating system independent is provided in accordance with a preferred embodiment. The technology will allow workers to access their unique desktops from any client device including the Internet, library, and home computers. No matter which device a person uses to access the system, their desktop will appear to "follow" them—including any restrictions or limitations on access to appropriate applications and content as defined the user profile. Government entities will be able to "rent" access to many applications on an as-needed basis, thereby saving on software licensing fees. The technology will allow government entities to reuse any existing client terminals as well as any existing software programs.

Performance

The architecture of the preferred embodiment keeps network-intense application activity within the data center, which results in bandwidth-independence. The Government Information Utility Solution provides LAN-like performance: regardless of the form of access to the system: modems, WAN, wireless LAN or Internet; and with only 20 KBPS of bandwidth per user.

Security

The Integrated Government Information Utility Solution provides security for applications and data because the data center—not the individual client terminals—is the sole point of installation for licensed software. This protects the government entities as well as the vendors from unauthorized use of the applications. In addition, this structure addresses concerns about the introduction and control of viruses in the LAN. Access to the Internet, software applications and user content will be restricted to only those sites/uses which are deemed appropriate by the government system administrators, as defined in each individual user profile.

Important Technologies in Accordance with a Preferred Embodiment

In addition to readily available hardware and software applications, several strategic technologies and services will need to be tightly integrated in order to offer the complete Newco Government Information Utility Solution:

Thin-Client/Server system software

Wireless LAN technology

Emulation software

Content providers

WAN infrastructure

Data center services

Dial-up infrastructure providers

LAN/Desktop management services (including on-site installation services, first line help support, etc.)

Other technologies will also be needed, including:

Customized applications, which will provide unique functionality, designed by AC.

Internet proxy servers providing a server-based filtering system to restrict Internet access to the appropriate websites and content.

Software emulators (e.g., Macintosh, Apple II).

Educational content providers, for example:
Training/Educational Content
Encyclopedia/Reference
Textbook Third-Party Strategy Overview Each component in accordance with a preferred embodiment will be identified and categorized according to strategic value to the offering. Components that can be characterized as mature products or services, widely available in the marketplace, and/or available through multiple vendors providing similar products or services will be considered of low strategic value. Generally, these components are provided on a competitive bid basis to ensure the lowest cost. Components that are unique in the marketplace or are otherwise critical to the system will be sourced through more formal contractual arrangements including, in certain cases, private-label OEM manufacturing agreements or preferred alliance agreements.

Product Profiles

Citrix WinFrame is a multi-user Windows application server based on Windows NT that supports enterprise application deployment using a thin-client architecture. This network-centric approach includes universal, thin-client software that works in conjunction with WinFrame multi-user application server software. Enterprise applications execute on the WinFrame server and are accessed through thin-client software over dial-up, LAN, WAN and Internet connections. The key to this thin-client architecture is a distributed Windows presentation protocol developed by Citrix, called ICA.

Citrix's Independent Computing Architecture (ICA) is a general-purpose presentation services protocol for Microsoft Windows. Conceptually, ICA is similar to the UNIX X-Windows protocol. ICA allows an application's logic to execute on a WinFrame multi-user Windows application server, located on the LAN. Only the user interface, keystrokes and mouse movements are transferred between the server and the client device over any network or communications protocol, resulting in minimal client resource consumption. ICA is designed to run over industry-standard network protocols, such as TCP/IP, NetBEUI, IPX/SPX, and PPP and industry-standard transport protocols, such as asynchronous (ASYNC), ISDN, Frame Relay and ATM.

The ICA protocol presents only the user interface from an executing machine on the display of another machine. ICA provides true location independence for Windows applications by running the Windows application at one location and executing the program's user interface somewhere else. This distributed Windows architecture allows Windows 16, Windows 32 and client/server applications to perform at very high speed over low bandwidth connections. It also allows 16- and 32-bit applications to run on legacy PCs as well as a new-generation of lightweight client devices.

A key component of a preferred embodiment is its Range-LAN2 OEM modules with ISA, Serial and PCMCIA connectors. RangeLAN2 OEM products include all of the industry-leading technology and features of the branded RangeLAN2 products, including 2.4 GHz gallium arsenide RF application specific integrated circuit (ASIC), custom digital signal processor ASIC, and wireless network controller ASIC. RangeLAN2 products operate at a data rate of 1.6 Mbps per channel, with 15 independent channels available. This multi-channel architecture allows up to 15 independent wireless LANs to operate in the same physical space providing up to 24 Mbps of aggregate network bandwidth. RangeLAN2 also features the most sophisticated mobility-centric network architecture of any wireless LAN product, including state-of-the-art seamless roaming, power management, advanced security, site survey diagnostics, and the IEEE-endorsed high-speed modulation technique (IEEE 802.11). OEM products are also WLIF (Wireless LAN Interoperability Forum)-compliant meaning that all products will interoperate. Using WLIF-compliant products, customers can choose from an even greater range of interoperable client and wireless networking solutions.

Figure 2:
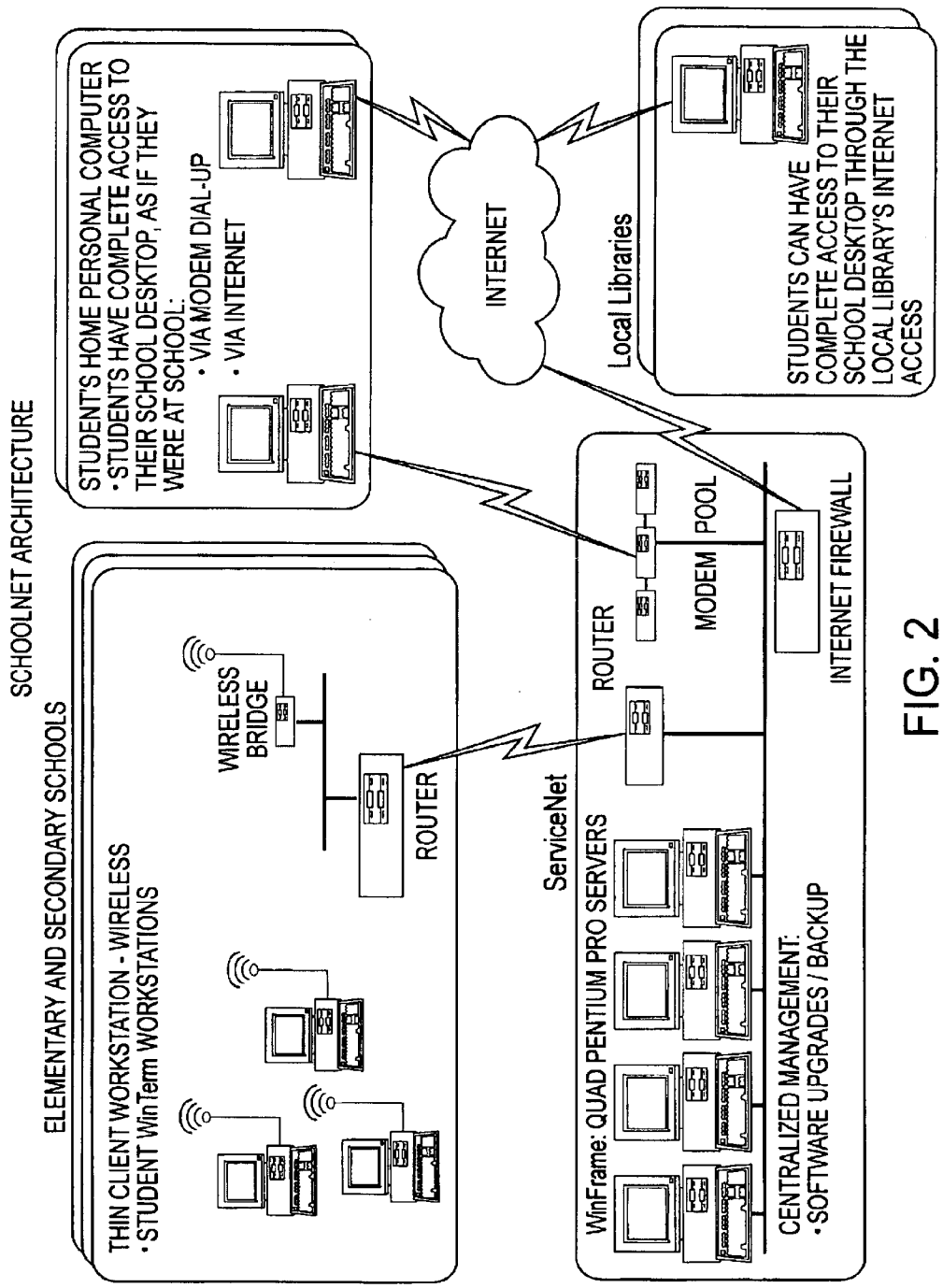
FIG. 2 illustrates a teaching architecture in accordance with a preferred embodiment.
Figure 13A:
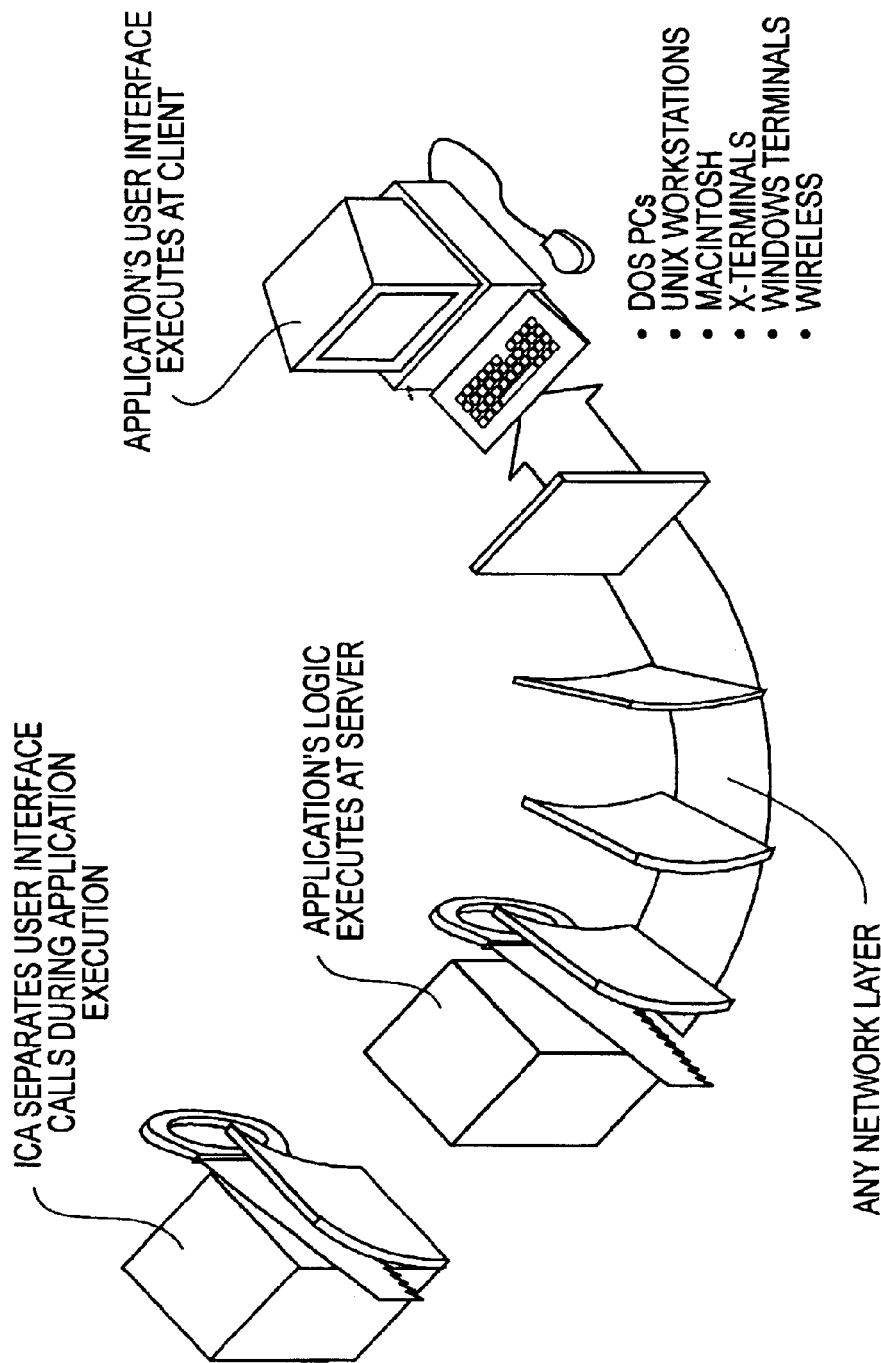
FIGS. 13A to 13F illustrate various architectures in accordance with a preferred embodiment.
Figure 13B:
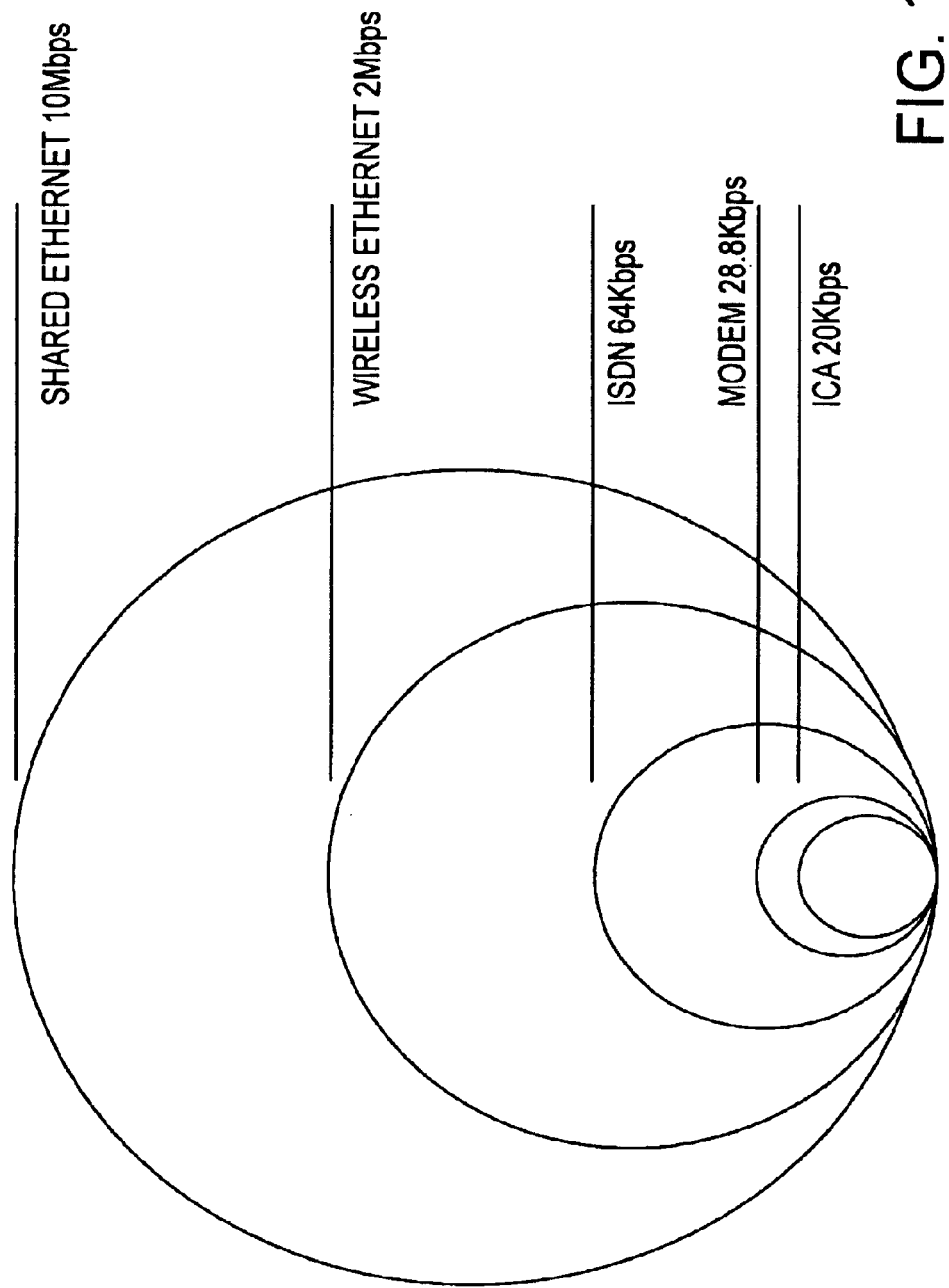
Figure 13C:
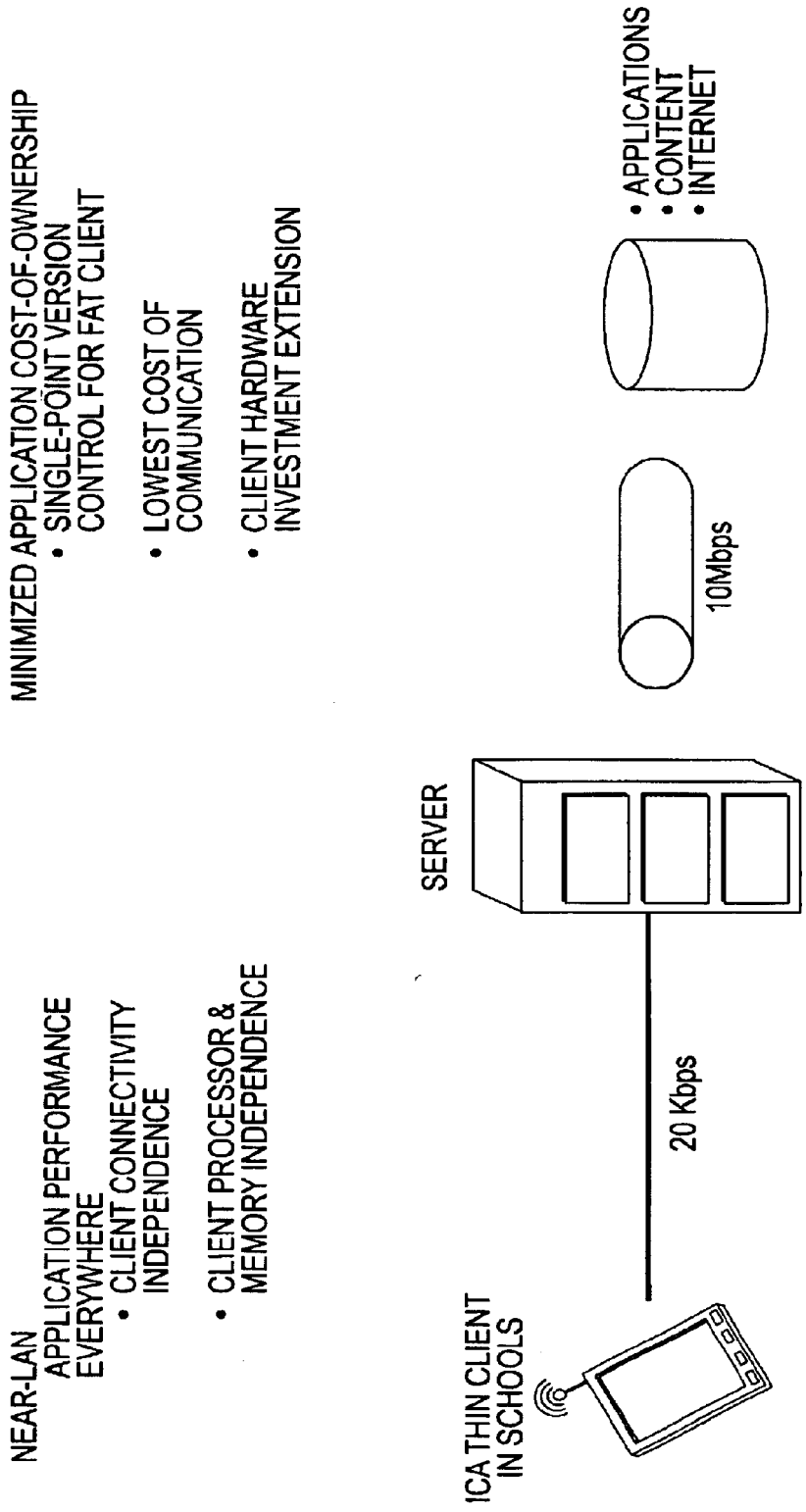
Figure 13D:
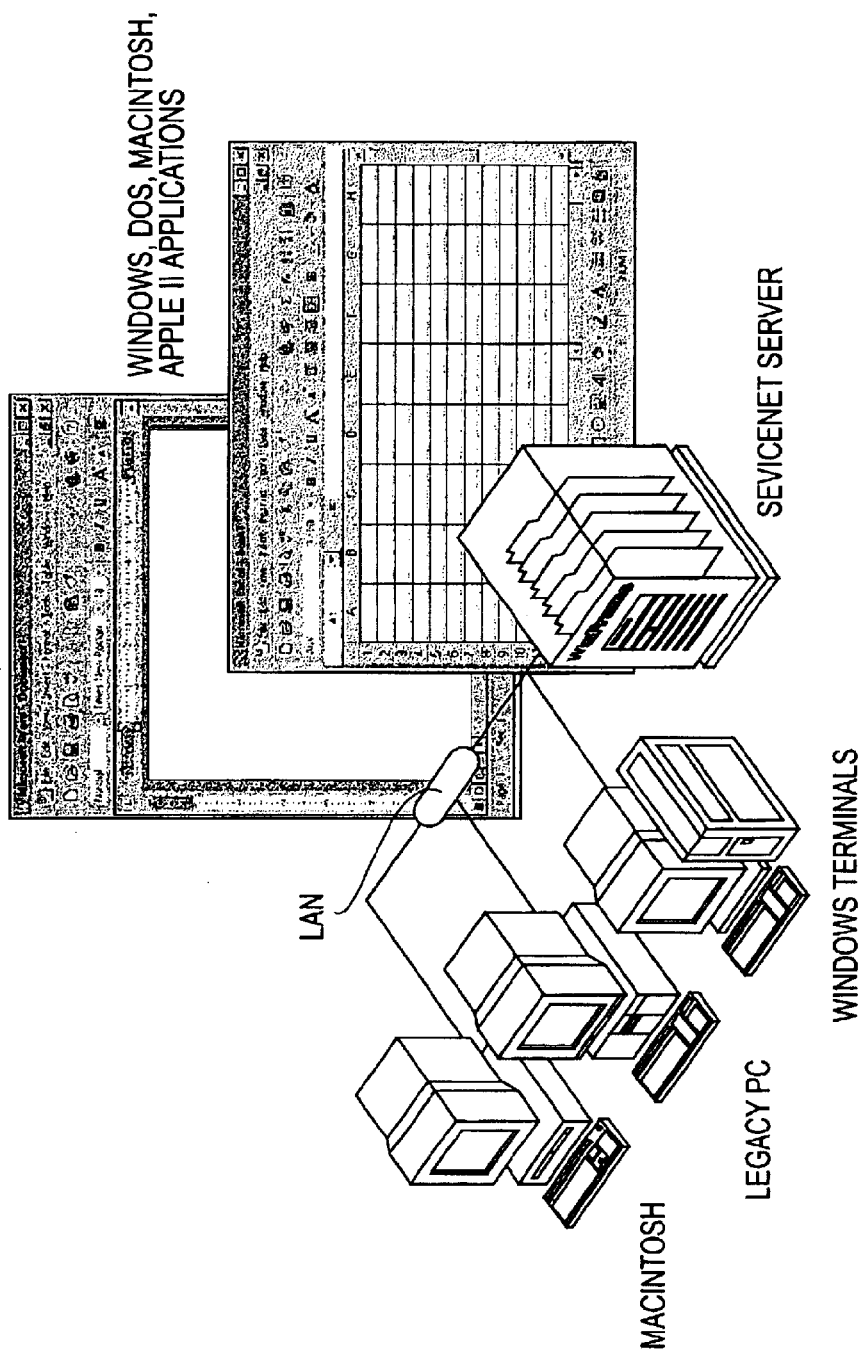
Figure 13E:
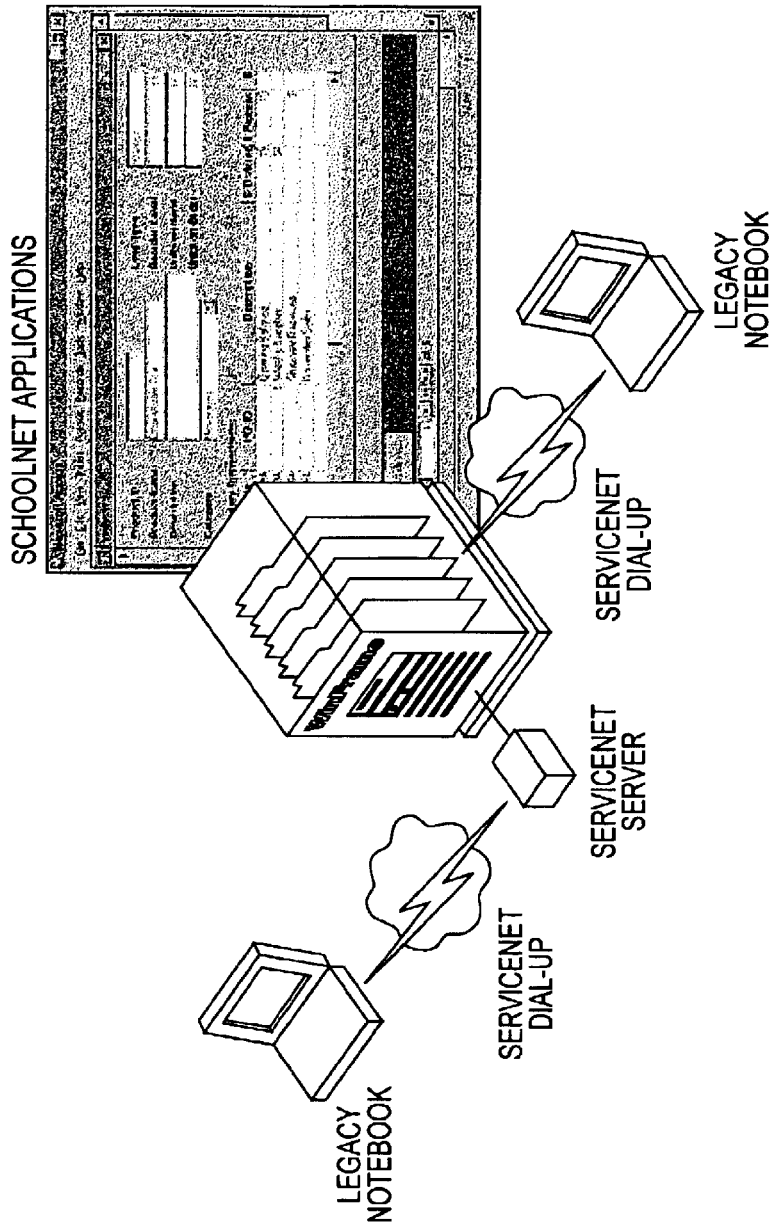
Figure 13F:
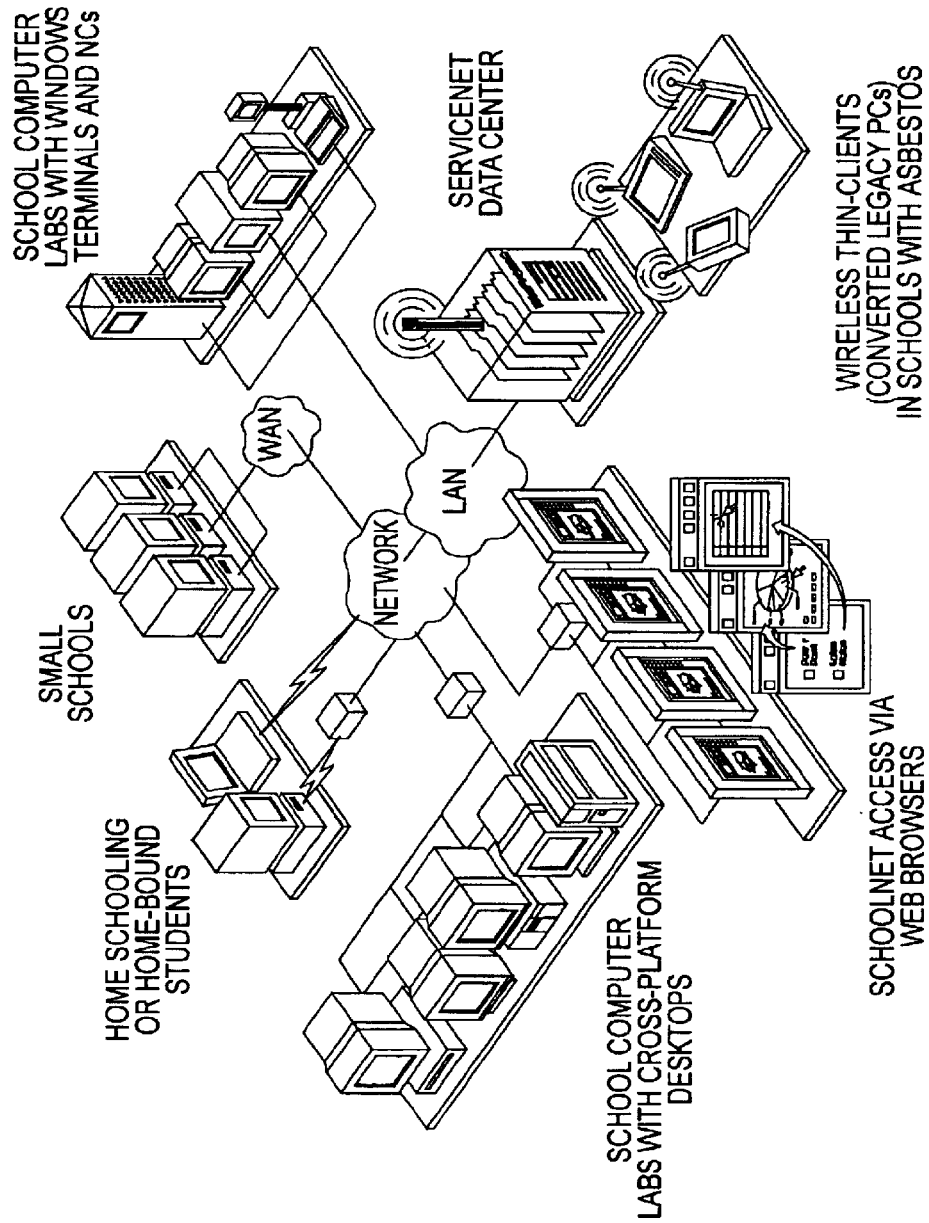

A preferred embodiment provides managed Internet access, desktop outsourcing and access to premium training, educational and other data content. AC will manage the operations of Newco under a management contract. Where appropriate, Newco will establish separate market-facing entities to deliver its offering to the various target market segments. FIG. 2 illustrates a teaching architecture in accordance with a preferred embodiment. The system provides a customized desktop environment of each level of student. Students can also access their desktops from a personal computer in the school, at home or at another remote site, like a library. Existing personal computer and Macintosh computers can be reused to provide access to the Internet utilizing a wireless LAN to avoid impacting existing communication lines. Teachers can use the system to broadcast their lessons, shadow student sessions and remotely control student's computers. Thin client technology is used to provide extended life cycles for clients, provide centralized application upgrades, Internet access, backup, security and control of existing personal computer resources.

WinFrame Server Setup in Accordance with a Preferred Embodiment

Installing WinFrame Operating System

Preparation Requirements

WinFrame installation media (Three setup diskettes and one CD-ROM).

Assuming installation of WinFrame on a Compaq Proliant server, the latest release of the Compaq Support Software diskettes (CSSD) for Windows NT 3.5x should be available (http://www.compaq.com/support/files/server/softpaqs/WINNT/NTSSD351.html). These disks will be required at different points throughout the installation.

Download any appropriate WinFrame Service Packs or HotFixes (ftp://ftp.citrix.com/winfrm17/). Ensure the PDC is running and connected prior to installing a WinFrame server as BDC or standalone server.

Installing WinFrame 1.7

Run the installation with the first of three WinFramne setup diskettes and the CD-ROM.

Install disk 2, select new install of WinFrame.

Choose the custom installation option.

Select "S"—to skip detection.

If installing on a Proliant 5000, skip to step 12

Select "S"—to specify the SCSI adapter and array controller.

Choose "Other" and place CSSD disk #1 in drive.

Choose "Compaq 32-Bit SCSI-2 controller for Windows NT 3.51".

Insert the third WinFrame setup disk at the prompt.

Once WinFrame has determined the computer components, select the "Computer: MPS Multiprocessor PC".

Select "Other" and place CSSD disk #1 in drive.

Choose "Compaq MPS Multiprocessor for Windows NT 3.51".

Select "No Changes: The above list matches my computer."

Select "Unpartitioned space".

Select "Format the partition using the NTFS file system".

Choose the default directory "\WINFRAME".

Press <ESC> to skip the examination.

When prompted for the "CSSD for Windows NT 3.51/4.0", insert disk 2 of current version of the CSSD.

When prompted again for "Compaq SSD for Windows NT 3.51/4.0", insert disk 1 of current version of Compaq SSD.

Once the reboot occurs, a WinFrame window will prompt you for the Name and Company. For Name, enter "SchoolNet". For Company, enter "Andersen Consulting".

In the "WinFrame Server Security Role" window, leave as standalone server or select the Backup Domain Controller radio button.

Install appropriate number of Microsoft Client Licenses necessary. For standard WinFrame server with no shared drives or remote access services, no additional client licenses are necessary. If these services are running, sufficient Microsoft Client Licenses (different from Citrix Client Licenses) must be enabled. This is a somewhat confusing issue; please contact your Microsoft reseller for additional licensing answers.

At the prompt window for the computer name, enter the WinFrame server name based on the standard naming convention (i.e. WLS-1, WLS-2, etc.)

When asked to verify the server name, check the name to ensure it is accurate.

When the "WinFrame Setup" window appears, select "Set up Only Windows Components".

At the next window, deselect those components that are not required. While it is good practice to remove programs such as games and screen-savers, users will be prevented from running this sort of software via their profile anyway.

When the "Network Adapter Card Detection" window appears, select "Do Not Detect".

When the "Network Adapter Card Detection" window appears, select "Continue".

Choose "Other" and place CSSD disk #1 in drive.

Type the path "A:\net\netflx3".

Select the driver listed in the window. The "Windows NT Setup" window will appear and a series of files will be copied to the hard drive.

Choose TCP/IP and NetBEUI for the network protocols.

In the "Windows NT TCP/IP Installation Options", select "TCP/IP Network Printing Support "and "Simple TCP/IP Services".

In the "WinFrame Dial-In Support" window, select "No".

In the "Network Settings" window, no changes are required.

In the "IP configuration" window, enter the appropriate addressing info (IP address, subnet mask, gateway, etc.) for the computer.

In the "Domain Settings" window, if the server is a standalone, (not a PDC or BDC) and it should become part of a domain, select the button next to the domain line.

Select the domain line and enter the name of the domain to enter.

Enter the administrator name and password.

Select "OK". If the administrator password is correct, a message welcoming you to the domain will appear.

In the "Virtual Memory" window, accept the default. (The paging file should be at least 1.5 x the physical memory of the machine. A 2GB paging file is not out of the ordinary.)

In "Date/Time" window, enter the date and time.

In "Display Settings" window, adjust colors.
After adjusting, select "Test".
When prompted to re-map the server drive letters, select "No".
When you have joined the domain, you will be prompted to install the licenses. Insert the base license disk.
Confirm the Base License Agreement and select "OK". Once the license is installed, you will be prompted for additional licenses. Select "No" and continue with the install.
The install will save the server installation and will ask you if you would like to make a Rescue Disk. Select "No". Note: A rescue disk should be made when the entire install, including service packs and hot fixes, is complete.
    The system will now ask you to reboot.
    In Program Manager, select 'File|Run'
    Type 'command'
    On command line, type 'setbuild /ms'
    Run 'setup.cmd' from CSSD disk #1
    Follow displayed directions for installing 'Compaq MPS Multiprocessor for Windows NT 3.51' and 'Compaq 32-bit SCSI-2 controller'
    On command line, type 'setbuild /oem'
Installing Hotfixes
    Occasionally, Citrix will release an update patch for WinFrame that corrects existing behaviors or adds new functionality. Information about these updates, as well as the actual executables, are available from Citrix's web site: http://www.citrix.com. It is a good idea to browse this site regularly for information related to WinFrame.
    Create a subdirectory in "C:\hotfix\" with the name of the Hotfix to be installed.
    Copy the Hotfix self-extracting archive into the newly created subdirectory.
    Enter the new hotfix subdirectory.
    Run the self-extracting archive.
    Run "/hotfix.exe/i" to install the patch.
    Reboot the server.
    Run "hotfix.exe/v" to verify successful installation of the patch.
Note: The command "hotfix" provides a multitude of diagnostic and maintenance capabilities related to these operating system patches; please refer to standard Windows NT Server documentation for more information on this command.
    FIG. 3 presents a list of many of the WinFrame v1.7 English hot fixes in accordance with a preferred embodiment. These fixes are applied to remedy a variety of known problems with the base application environment.
Install Network Monitor Agent
    In 'Control Panel', choose 'Network' utility
    In 'Network Settings', choose 'Add Software'
    Select 'Network Monitor Agent'
Optimizing TCP/IP Settings for High-latency, WAN-connected WinStations
    Logon to the system as an administrator
    Delete all existing TCP/IP WinStations from 'WinStation Configuration' utility located in 'Administrative Tools group.
    From Program Manager, select 'File|Run'
    Type 'REGEDT32'.
    Select the hive: //HKEY_LOCAL_MACHINE/SYSTEM/
    CurrentControlSet/Control/Citrix/Pds/tcp
    Double-click on 'OutBufDelay'.
    Click on decimal.
    Lower the value to anywhere between 50–100
    Recreate all TCP WinStations as described in section 2.2.4. Configuring WinStation Connections
    Repeat entire process until Optimal results are achieved
Changing Screen Saver Settings to Optimize Performance
    Idle WinStations consume valuable system resources (CPU, memory, etc.) on a multiuser system. By changing several screen saver settings, the effects of idle terminals are greatly reduced
    Logon to the system as an administrator
    From Program Manager, select 'File|Run'
    Type 'REGEDT32'.
    Select the hive: '\\HKEY_USERS\DEFAULT\Control Panel\Destop'
    Change value of 'ScreenSaveTimeOut' to '300'
    Replace 'logon.scr' with 'black16.scr' in 'SCRSAVE.EXE'
Creating Emergency Repair ('Rescue') Disk Set
    Have at least 1 3.5", 1.44 MB formatted disk available for each WinFrame server prior to beginning this operation.
    Logon to the system as an administrator
    From Program Manager, select 'File|Run'
    Type 'rdisk'
    Choose 'Save Repair Info'
    When finished, label the disk with the server name and date. Write-protect this disk and store in a safe place.
Installing Licenses
    Logon to the system as an administrator
    From the 'Administrative Tools' group run 'WinFrame Licensing'
    Choose 'License|Add' from menu bar.
    Type Base License Serial Number into dialog box
    Read and accept terms and conditions, and click 'OK'
    Add 'Load Balancing' and '5-Client' packs as above
    Highlight any user license groups you wish to 'pool' in a load balancing configuration
    Choose 'License|Change License Pool' from menu bar
    Type the number of licenses to pool
    Repeat steps 8 & 9 for all licenses to be 'pooled'
Activating Licenses
    Open a web browser to http://www.citrix.com/misc/wfreg17.htm
    Activate the registration link
    Complete the registration form. When finished, a valid 'activation code' will be presented.
    Logon to the WinFrame system as an administrator
    From the 'Administrative Tools' group run 'WinFrame Licensing'
    Highlight license to be activated.
    Choose 'License|Activate License' from menu bar.
    Type the Activation Code for the desired license.
Configuring WinStation Connections
1. Log in as Administrator.
2. From the 'Administrative Tools' group run 'WinStation Configuration'
3. Double click on the line entry for the TCP/IP protocol ("tcp#001-0xx").
4. Inside the "Network Transport Configuration" box there will be a field for "Number of configured WinStations"; increase the number so that it equals the maximum number of client connections to accept on the server, i.e., 50.
5. Select the 'Advanced WinStation' button
6. Deselect all 'inherit user config' checkboxes
7. For 'On a broken or timed-out connection', select 'disconnect'
8. For 'Reconnect sessions disconnected', select 'from any WinStation'

9. For 'Shadowing' field, select 'is enabled: input ON, notify OFF'

WinFrame Load Balancing

Creating a Load-Balancing Cluster
1. Log in as Administrator.
2. From the 'Administrative Tools' group run 'Application Configuration'
3. Choose 'Application|New' from the menu bar
4. Enter 'WLS' for the application name
5. Choose 'Explicit' for the application type.
6. Select the 'WLS' global group and add it to the list of user groups allowed to access the application
7. Choose all available WinFrame servers and add them to the configuration list Configuring Load-Balancing
1. Log in as Administrator.
2. From the 'Administrative Tools' group run 'Application Configuration'
3. Highlight 'WLS'
4. Choose 'Configure|Load Balancing' from menu bar
5. Highlight the first server and choose 'Edit'
6. Adjust parameters. Set 'Assume User load is 100% at:' to 50 and click 'Use Default Advanced Factors'
7. Repeat steps 5 & 6 for all WinFrame servers Integrate WinFrame Servers Into WindowsNT Domain WinFrame-specific Profile Entries WinFrame user profiles contain all of the information stored in traditional Windows NT user profiles, plus additional, MultiWin-specific configuration entries. The standard Security Account Manager (SAM) database found on traditional WindowsNT machines has no entries for these MultiWin fields. When users log into a WinFrame host but are authenticated on an NT PDC or BDC, these MultiWin configuration details WILL NOT be correctly set.

The solution is to modify SAM databases on all NT-based PDC/BDC domains to include MultiWin specific fields. Citrix provides a utility to accomplish this.

3.1.1. Convert SAM database on WindowsNT PDC
1. Log in as Administrator.
2. From Program Manager run 'File Run'
3. Type 'command'
4. From command line, run 'CNVRTUC' against PDC
5. Reboot both WinFrame server and PDC
6. Ensure that PDC information is replicated throughout the domain WLS User Configuration WLS User & Group Scheme This section will be written in cooperation with NT domain administrators at ServiceNet WLS User Profiles All user profiles will be 'mandatory' as opposed to 'personal'; that is, students and teachers will not be able to change any desktop or configuration settings. There will be one profile for each grade level, reflecting the increased permissiveness and requirements of older children. There will be one profile for all teachers, and one profile for each administrative function (headmaster, secretary, etc.). Creation and support of profiles will be done through two administrative accounts. The first is a template account for creating new users. The second is a profile manager account for changing any configuration or desktop settings.

Creating a User Template

The user template is set up with the creation of a new User Profile. It is used to add users. All user template names should end with '_temp' so that they can easily be identified in 'User Manager for Domains'.

Login as administrator.

In "User Manager for Domains", select "New User" from the "User" pull-down menu.

Type in the template name, ensuring that it ends with _temp.

Enter an appropriate description, so that account can easily be identified, such as "template account for the WLS $4^{th}$ Grade".

Enter the password twice for the account.

Select the "User Cannot Change Password", "Password Never Expires", and "Account Disabled" boxes.

Press the "Groups" button to bring up the "Group Memberships" window and add both the "WLS" group and the specific group to which that user belongs.

Note: All users are apart of the WLS group. The WLS group should always be used when setting up a new profile or a new user. In addition, each user is also a member of a more specific group, such as $4^{th}$ Grade or Teachers, as an organizational convenience for the administrator.

Ensure that "WLS" is the Primary Group

Select "OK "to exit the Group Memberships window.

Press the "Profile" button to open the "User Environment Profile" window.

In the "WinFrame Profile Path", enter the path "\\PDC\Profiles\<name_of_profile.man>"

In the "Connect" field select "H:" as the drive letter and enter the path "\\PDC\Home\%USERNAME%".

Select "OK" to exit the "User Environment Profile" window.

In the "User Properties" window, select "OK" to exit.

Creating a Profile Manager

Each time a user profile is created, an accompanying profile manager should be created.

The user profile is mandatory (.man), and the profile manager is personal (.usr); other than that, the files should always duplicate each other.

Login as administrator

In "User Manager for Domains", select the appropriate template account, such as 4th_grade_temp.

Select "Copy" from the "User" pull-down menu.

Type in the template name, ensuring that it ends with _manager.

Enter an appropriate description, so that account can easily be identified, such as "profile manager account for the WLS $4^{th}$ Grade".

Enter the password twice.

Deselect the "Account Disabled" checkbox

Press the "Profile" button to open the "User Environment Profile" window.

In the "WinFrame Profile Path", enter the path "\\PDC\Profiles\<name_of_profile.usr>"

Press the "Groups" button to bring up the "Group Memberships" window and add 'Administrators'.

Select "Add".

Logoff current WinFrame session, and login with newly created profile manager account. Create desktop groups and icons accordingly. Section 4.2.6 lists the applications that should be available to each functional group.

To modify the "Control Panel" settings for this profile, select "Run" from the "File" pull-down menu. Type "control" to bring up the "Control Panel" window and make the required modifications, such as changing the default printer connection or setting user environment variables. When the modifications in "Control Panel" are complete, exit the "Control Panel" window.

From the desktop, ensure that "Save Settings on Exit" from the "Options" pull-down menu is deselected.

Select "Run" from the "File" pull-down menu.

Type "upedit" to bring up the "User Profile Editor" window.

Ensure that the following checkboxes are checked: 'Disable Run in File Menu' and 'Disable Save Settings Menu Item and Never Save Settings', Ensure that the following checkboxes are NOT checked: 'Show Common Program Groups', 'Allow User to Connect/Remove Connections in Print Manager', and 'Wait for Logon Script to Complete Before Starting Program Manager'

Make all appropriate program groups Locked.

Ensure that the users in question are permitted to use the profile (make sure their group is listed, or a subgroup of the group listed, in 'Permitted to Use Profile')

In 'For Unlocked Groups, Allow Users to:', select 'Change Program Item Properties Except Command Line'

Select "Save As File" from the "File" pull-down menu.

Select "Network" in the "Save As" window.

Save the current profile in the "\\PDC\Profiles\" directory as both a mandatory and standard profile (.man and .usr extensions, respectively).

After saving the ".man" and ".usr" profiles exit all windows to return to the main desktop.

Logoff WinFrame.

Creating a New User

Login as administrator.

In "User Manager for Domains", select the appropriate template account, such as 4th_grade_temp.

Select "Copy" from the "User" pull-down menu.

Enter the user's full name in the "Full Name" field.

Enter the user's password twice.

Deselect the "Account Disabled" checkbox

Select "Add".

Repeat steps 2–7 as necessary.

Logon with the newly added username(s) and password(s) to ensure that the profile(s) have been been correctly assigned.

Modifying an Existing Profile

The profile manager is used as the vehicle for making required changes to User Profiles as described below:

Login with the appropriate profile manager account.

Create desktop groups and icons accordingly. Modify all relevant configuration documentation.

To modify the "Control Panel" settings for this profile, select 'File|Run'. Type 'control' to bring up the "Control Panel" window and make the required modifications From the desktop, ensure that "Save Settings on Exit" from the "Options" pull-down menu is deselected.

Select "Run" from the "File" pull-down menu.

Type "upedit" to bring up the "User Profile Editor" window.

Make any required changes in the "User Profile Editor" window.

Select "Save As File" from the "File" pull-down menu.

Select "Network" in the "Save As" window.

Save the current profile in the "\\PDC\Profiles\" directory as both a mandatory and standard profile (.man and .usr extensions, respectively). Ensure that the filename is consistent with standard profile naming conventions.

When the window appears asking if you want to overwrite the existing file, select "Yes".

After saving the ".man" and ".usr" profiles exit all windows to return to the main desktop.

Logoff WinFrame.

Common Profile Permissions for WLS Users

All User Profiles carefully limit user activity during a session. In addition, any changes made during a session, such as re-sizing a window, are not saved when the user logs off WinFrame.

Each User Profile is designed so the users cannot perform the following functions:

Create a "Personal Program Group" using the "New" command under the "File" menu.

Create a "Program Item" or "Common Program Group" using the "New" command under the "File" menu.

Use the 'Move", "Copy", "Delete", or "Run" commands under the "File" menu.

Change their passwords using the "Winframe Security" pull-down menu option under "File" and selecting "Change Password".

"Arrange Icons" under the "Window" menu.

"Save Settings on Exit" under the "Options" menu .

"Save Settings Now" under the "Options" menu.

Each User Profile is designed so the users can perform the following functions:

View the "Program Item Properties" using the "Properties" command under the "File" menu.

Note: The user cannot modify the properties in any way.

Lock the workstation using the "Winframe Security" pull-down menu option under "File" and selecting "Lock Workstation".

Use "Auto Arrange" and 'Minimize on Use" under the "Options" menu.

Use "Cascade" and "Tile" under the "Window" menu.

Use all help functions under the "Help" menu.

FIG. 4 is a user profile table in accordance with a preferred embodiment. The various fields are completed as the system is installed in a school or other industrial environment to define the system environment.

WLS Print Architecture

Rationale

WLS users are encouraged to print to the network attached printers located in each computer lab. These printers have higher duty cycles, require less maintenance, and will provide better performance than other devices. No additional printers can be added without contacting the Help Desk. The Help Desk does NOT have responsibility for maintaining printers, only for maintaining printer availability through the servers and network.

Many classrooms will have a single workstation capable of printing to a locally attached inkjet printer. This workstation is 'thicker' than a typical thin client, and should be able to support low-volume printing without experiencing debilitating performance issues. This printer is NOT shared across the network and is hence inaccessible by other thin clients. Each grade profile will include the ability to print to all network printers, and also any locally attached printers in the appropriate classrooms.

Naming Convention for Centrally Managed Printers

The naming convention used for centrally managed printers located in the WLS computer labs is as follows.

Data Center Firewall Setup

Defining SchoolNet Security Policy

Thin-Client Installation

Win95 to Thin-client Conversion

Preparation Requirements:

Win95 workstation with properly installed and configured TCP/IP connection WinFrame server IP address.

Installing WinFrame Client

Insert WinFrame client disk into drive.

Select "Start", then "Run".

Type "A:\setup".

Allow all default installation parameters.

Configuring WinFrame Client for WLS

Double click on the Remote Application Manager icon on Win95 desktop. At the prompt to enter a new entry, select "No".

Select "Options", then "Settings . . . ".
In the "Settings" window select the "Server Browsing" tab.
In the "TCP/IP Address:" field type the IP address of the WinFrame server you wish to connect to. If you are connecting to a cluster, choose the ICA master browser.
Click "OK".
Select "Entry", then "New".
Select the "Network Connection" radio button, click on "Next".
In the "Description:" field, enter 'WLS'.
In the "Network Protocol:" pull down menu, select "TCP/IP".
In the "Server" field, select the WinFrame server or Cluster name you are connecting to. Click on "Next".
In the "Add a new Remote Application window" click on the "Change . . . " button.
In the "Windows Properties" window, deselect "Use default" checkbox.
Select the "640×480" radio button.
Select "OK".
Click on "Next".
Leave the "Application:" and "Working Directory:" fields blank. Click on "Next".
Click on "Next" and "Finish".
Close the "Remote Application Manager" window.
Right click on the "Remote Application Manager" icon then select "Properties".
In the "Remote Application Manager Properties" window, select the "Shortcut" tab.
The "Target" field will read: "C:\Program Files\Citrix\WinFrame Client\wfcmgr32.exe". Edit the executable filename to: "wfcrun32.exe".
After the second double-quote insert one space and type the name that was entered in the description field.
Note: This Must be Copied Exactly. For Example, in double-quotes, the name of "WLS" would be entered, I.e. "C:\Program Files\Citrix\WinFrame Client\wfcrun32.exe" "WLS".
Close the "Remote Application Manager Properties" window.
Configuring the WLS Desktop
　　Starting the WinFrame Session
　　Double click on the "WLS" icon. The WinFrame session will initiate and bring you into a log on prompt. In the "From:" field will be the server name description.
　　Type in the userid and password.
　　Select "OK". The WinFrame session will execute.
Win3.x-Thin Client Conversion
　　Preparation Requirements
　　Win3.x workstation with properly installed and configured TCP/IP connection WinFrarne server IP address.
Installing the WinFrame Client
　　Insert WinFrame client disk into drive.
　　Select "Start", then "Run".
　　Type "A:\setup".
　　Allow all default installation parameters.
Configuring the WinFrame Client
　　Double click on "Remote Application Manager" icon. At prompt to enter a new entry, select "No".
　　Select "Options", then "Settings . . . "
　　In the "Settings" window select the "Server Browsing" tab.
　　In the "TCP/IP Address:" field type the IP address of the WinFrame server you wish to connect to. If you are connecting to a cluster, choose the domain controller.
　　Click "OK".
　　Select "Entry", then "New".
　　Select the "Network Connection" radio button, click on "Next".
　　In the "Description:" field, enter "WLS".
　　In the "Network Protocol:" pull down menu, select "TCP/IP".
　　In the "Server" field, select the WinFrame server or Cluster name you are connecting to. Click on "Next".
　　In the "Add a new Remote Application window" click on the "Change . . . " button.
　　In the "Windows Properties" window, deselect "Use default" checkbox
　　Select the "640×480" radio button.
　　Select "OK".
　　Click on "Next".
　　Leave the "Application:" and "Working Directory:" fields blank. Click on "Next".
　　Click on "Next" and "Finish".
　　Close the "Remote Application Manager" window.
　　Single click on the "Remote Application Manager" icon, select "File" then "Properties".
　　The "Command line:" will read: "C:\WFC16\wfcmgr.exe". Edit the executable filename to "wfcrun.exe".
　　Insert one space after the .exe extension and type the name that was entered in the description field.
Configuring the WLS Desktop
　　In "File Manager", install WLS icon file (WLS.ico, located in the shared directory) into the "C:\%systemroot%\system\" directory.
　　Single click on the Remote Application Manager Group icon.
　　Select "Properties".
　　In the "Description:" field type "WLS".
　　Double click on the WLS group icon.
　　Single click on the "Remote Application Manager" icon.
　　Select "Properties".
　　In the "Description:" field type "WLS".
　　In the "Program Item Properties" click on "Change icon . . . ".
　　Click on "Browse . . . ".
　　Find and select the "WLS.ico" file. Select "OK".
　　Select "OK" again.
　　Single click on the WLS icon.
　　Select "File" then "Copy".
　　In the "Copy Program Item:" window select the pull down menu bar and select "WLS". Click "OK".
　　Single click on the "WLS" icon.
　　Select "File" then "Copy".
　　In the "Copy Program Item:" window select the pull down menu bar and select Startup.
　　Click "OK".
Configuring the Wireless Networking Parameters
Caution: By configuring the Domain and Security ID, the PMA will only communicate with access points within the same Domain and with the same Security ID.
　　From the shared directory on the network drive, copy "r12setup.exe" to the c:\wfw311 directory.
　　If Windows 3.1x is loaded, exit Windows.
　　Using Notepad open the autoexec.bat file
　　Remark the line "wfw311\net start".
　　Remark the line "win", if installed.
　　Save the file and exit Notepad.
　　Press Ctrl-Alt-Del.
　　At the DOS prompt type "cd wfw311".
　　Type r12setup.
　　Using the tab key, highlight "Continue".

If the RangeLAN2/PCMCIA Setup Window appears, continue. Otherwise skip to step 14.
  Leave all defaults
  In the "Directory:" window type "c:\wfw311".
  In the "Station Type" scroll-box, use the down-arrow to select "Station".
  Using the tab key, highlight "Advanced".
  Using the tab key, highlight "Network Domain" scroll-box, use the down-arrow to select "15".
  Using the tab key, highlight "Roam Config", use the down-arrow to select "Fast".
  Using the tab key, highlight "Ok".
  Using the tab key, highlight "Ok".
  Using the tab key, highlight "Test/Utilities".
  Using the tab key, highlight "Security ID".
  In the warning window, highlight, "Continue".
  Enter the proper Security ID.
  Highlight "OK".
  In the confirmation window, ensure "OK" is highlighted.
  Highlight "Done".
  Highlight "Exit".
  Edit the Autoexec.bat file and remove the two remarked lines.
  Save and exit Notepad.
  Press Ctrl-Alt-Del Changing the Client Security ID
  If the wireless network security must be changed, follow the below procedures:
    If Windows 3.1x is loaded, exit Windows.
    Using Notepad open the autoexec.bat file
    Remark the line "wfw311\net start".
    Remark the line "win", if installed.
    Save the file and exit Notepad.
    Press <Ctrl>-<Alt>-<Del>.
    At the DOS prompt type "cd wfw311".
    Type "rl2setup".
    Using the tab key, highlight "Test/Utilities".
    Using the tab key, highlight "Security ID".
    In the warning window, highlight, "Continue".
    Enter the proper Security ID.
    Highlight "OK".
    In the confirmation window, ensure "OK" is highlighted.
    Highlight "Done".
    Highlight "Exit".
    Edit the Autoexec.bat file and remove the two remarked lines.
    Save and exit Notepad.

Backbone Configuration in Accordance with a Preferred Embodiment

The WLAN design in accordance with a preferred embodiment is comprised of 4 'cells' on three domains. One domain, including the access points in the gymnasium and nurse's station will handle all mobile clients in the school, as well as desktops located inside the gym; the other domains will be reserved for wirelessly attached desktops on each wing. Note that if desktops are physically moved from one wing to the other, some trivial WLAN driver reconfiguration must be performed.

Gymnasium Radio Configuration
  The access point in the gym is a repeater product, with two radios: one is configured at a station and handles the uplink to the school backbone, while the other is configured as a master and handles all wireless client devices. The configuration for the station is identical to any wireless client connecting to the Primary Wing; the configuration for the master is detailed below. FIG. 5 is a gym radio configuration in accordance with a preferred embodiment.

Nurse's Station Radio Configuration
  The access point in the nurse's station handles all mobile devices in the school, and is on the same domain as the access point in the gym. This will enable mobile devices to roam seamlessly, throughout the school, the grounds, and inside the gym. FIG. 6 is a nurse's station radio configuration table in accordance with a preferred embodiment.

Wing Radio Configuration
  The access point in the primary wing handles all desktops in the primary wing. FIG. 7 is a wing radio configuration table in accordance with a preferred embodiment.

Configuration Tables
  Radio Configuration

| Name | Domain | Channel | Subchannel | Function |
|---|---|---|---|---|
| NURSE | 3 | 2 | 1 | All Mobile Clients in School |
| GYM | 3 | 3 | 1 | Mobile Clients/Desktops in Gym |
| PRI_WING | 4 | 4 | 1 | Desktops in Primary Wing |
| SEC_WING | 5 | 5 | 1 | Desktops in Secondary Wing |

Hardware Configuration

| Name | IP Address | MAC Address | Serial Number | Radio ROM Version |
|---|---|---|---|---|
| GYM | | | | |
| NURSE | | | | |
| PRI_WING | | | | |
| SEC_WING | | | | |

Authorization Table

| MAC Address | Physical Location of Device |
|---|---|
| | |
| | |
| | |
| | |

Thin-Client Friendly
  A fundamental premise in accordance with a preferred embodiment is delivering centrally managed capability to distributed clients via 'thin client/server computing' principles. This means that all solutions maximize the benefits of having centralized complexity, work in MultiWin® (WinFrame/Terminal Server) environments and deliver acceptable performance.

Transparent to end-user
  The educational sector is, as a whole, relatively inexperienced with enterprise class computing solutions. Computational experience must be designed for ease of use and complexity minimized and made completely transparent to the end user. Features in accordance with a preferred embodiment include deployment of single sign-on solutions, intelligent scripting to make configuration 'decisions' automatically, etc.

Scalability
  Business forecasts includes deployments at very large clients. Solutions must scale into the hundreds of thousands of end users, distributed across hundreds of campus locations.

License Management/Software Metering

A system in accordance with a preferred embodiment is very similar to a service bureau. The system provides managed access to data and, most importantly, applications by which this data is accessed. Most, if not all, of these applications have been developed by a third party. In accordance with a preferred embodiment, a school district may purchase the rights to an office suite running concurrently on 75% of its workstations, or a math tutor running on 3%.

Requirements

License Management

A centralized repository for managing all licensed assets is necessary to serve as a check against real-life usage criteria, both manually in the case of 'soft' metering, and automatically in the case of 'hard' metering.

Application Usage Report Generation

It is necessary to have access to application usage historical data for many reasons. First and foremost, to ensure that the agreements we have in place are sufficient. If they have not purchased sufficient access to applications, these reports will serve as a valuable tool to justify additional licenses. Secondly, the reports will document which applications are heavily used by which classes of users to improve our ability to target value-added instruction/curriculum integration. Lastly, client school administrators will want to see these sorts of reports, both to audit our pricing, to perform budgeting and license capacity planning exercises, and to enforce 'big brother' disciplinary policies ("What! Johnny plays 'Solitare' 3 hours a day? I'd better talk to him . . . ").

Hard Metering

For key applications: 'hard metering' will likely be required. That is, when concurrent usage reaches a pre-defined threshold, no additional copies of the application will be allowed to start. This relative ease of implementing such a tool is one of the key benefits of our centralized architecture.

Technologies

Note that all of these solutions require a repository to store license information as well as usage data. This is typically an ODBC-compliant database solution, such as a SQL Server by Oracle or Sun. This sort of repository will be required to support scalable manageability across many aspects of our solution domain, and is a large and important new addition to our conceptual design and cost model.

Distributed Enterprise Management

Enterprise Management utilities, such as IBM/Tivoli TME10 or Computer Associates Unicenter, perform license management, software metering, and much more: They are intended for large, distributed corporate environments and as such are overly complex and expensive to install and administer.

Specialized Software Metering

In fact, the high degree of difficulty involved with the deployment and maintenance of a Distributed Enterprise Management solution has led 75% of companies towards deploying a parallel, separate, specialized platform to perform license management. Some packages in this class include CentaMeter, ExpressMeter, LicenseTrack, LANLicenser, and SofTrack. These packages typically integrate with other systems management utilities, such as HP OpenView or Microsoft SMS.

Thin Client/Server Metering

At least one application intended to perform license management and software metering on thin client/server computing platforms has been developed.

Managed World Wide Web Access

Requirements

Content Filtering

A key component of the AC MEN solution is the efficient. Managed browsing of educational content on the World Wide Web. Students should be denied access to content deemed unacceptable as defined by state and local legislation, community standards of acceptability, and school policies.

Variable Access Levels

Granular control of this definition of acceptability, to be applied on a per-student basis (probably under the auspices of 'age' or 'grade-level' to simplify management) should rest in the hands of school administration. For ease of use, these access levels should ideally be integrated with a user's login privilege levels to allow seamless, single-sign on capabilities.

Content Caching

A common scenario involves having an entire class of students access the same internet content as part of a classroom activity. Thus, another important element of the AC MEN solution is the caching of frequently accessed content to speed access times and reduce the bandwidth required for external internet connectivity, leading to lower overall costs.

Monitoring and Reporting

By monitoring the activity to the Internet, it will be possible to produce reports that detail usage patterns. This will be valuable in forging partnerships with content providers, in developing a knowledge-sharing mechanism by which teachers can learn from each other's experiences, and in resolving any disciplinary issues that arise from unauthorized or improper activity.

Fault-Tolerance

There should be no single point of failure with regards to managed browsing. In the event of a failure, the detailed design for the specific opportunity will determine whether the connection fails 'open' or 'closed'.

Customization Potential

A custom content filtering service is provided in accordance with a preferred embodiment.

Technologies

"Standard" Browser Capabilities

Both Netscape Communicator and Microsoft Internet Explorer have built-in management functionality. They are both able to use built-in RSAC/PICS Ratings, or third party software for more granular filtering. They both maintain a cache of frequently hit sites, although maintaining separate caches for each user is not an efficient or scalable approach. The 'open source' approach offered by Netscape allows any imaginable customization, albeit with significant skilled effort. The Internet Administration Kit (IAK) allows moderate customization of Internet Explorer; additional customization is possible by writing a browser that employs components of Internet Explorer.

"Custom" Browser Capabilities

Web-filtering (and other kid-friendly) features can be incorporated at the browser level by using third-party and/or custom programming. SurfMonkey, for example, is a specialized browser for children based on the Internet Explorer engine (using the component-driven method mentioned above). It features built-in granular content filtering, an integrated 'start site' with kid-friendly content, filter chat rooms for children, and a customized interface.

IWS ChildProof Proxy

This solution is currently deployed as a component of the Test/Pilot architecture. The ChildProof proxy is a software-based content filtering proxy. It performs no caching. Developed by a small startup in Phoenix, its objective is to provide tailored content filtering for the educational sector. Currently, the solution is limited to Sun hardware and software platforms; in fact, it is the only element of the Test/Pilot architecture that runs on a non-Windows NT operating system.

In fact, all content access levels are assigned on the basis of IP address, which offers NO granularity in a thin-client environment. Furthermore, its content filtering is based on a simple list of pre-defined IP addresses or Fully Qualified Domain Names (FQDN); no keyword or image analysis filtering is implemented. Given the dynamic nature of the World Wide Web, this approach has been rejected by most major filtering solutions. It is not even possible to block access to part of a site (such as certain areas of AOL) and allow access to other areas; this is important, as many sites aimed at students are hosted by 'amateurs' using a web hosting service rather than corporations with their own domain names. The default list is woefully inadequate; sites as obvious as, for example, http://www.sex.com/ are not blocked automatically. This solution supports ONLY HTTP traffic (IP traffic on port 80); no proxying of other protocols (including HTTP-S or FTP) is performed. Lastly, this platform has suffered from reliability issues. Because it does not support load balancing among redundant peers, the proxy acts as a single point of failure: if the machine becomes unstable for any reason, users are unable to access all internet content. The immaturity of the codebase has in fact led to several such outages in the Test/Pilot environment Standard Proxy Server Capabilities The two industry leading firewalls are Netscape Proxy v3.5 (the current standard for Andersen Consulting's internal network) and Microsoft Proxy v2.0. In their most recent versions, these two products have very similar functionality. These products are software-based cache proxies. Their core functionality is to act as a proxy between web clients and the firewall to allow for better security, and to cache content to reduce the number of requests that must be fulfilled over the Internet. With the addition of optional components (plug-ins), it is possible to extend their functionality to perform detailed content filtering, report generation, virus scanning, and more. The Netscape product runs on Windows NT and UNIX platforms; the Microsoft product is NT-only. Both of these products support integration with the Microsoft Domain Authentication scheme, allowing access levels to be defined according to domain groups via a single sign-on. Several popular content filters (with broad brand recognition) are available as plug-ins, including SurfWatch, CyberPatrol, SmartFilter, and X-Stop; these products offer keyword-based filtering in addition to the URL filtering available as a part of the base proxy. The databases associated with these commercial products are huge and well established. Plug-ins, such as WebSense, ProxyReporter, ProxyReport, and Telemate, allow the automatic generation of reports tracking which URLs were accessed (or attempted to be accessed) by specific users. Virus-scanning plug-ins are available from TrendMicro and Network Associates. Rapid, efficient caching is a standard feature of both products. Support for many protocols, including HTTP. HTTP-S, FTP, and others is standard, as is support for SOCKS v5 proxying to allow many non-standard, application level traffic streams to be proxied. These products also support automatic configuration of browser software, to simplify implementation and maintenance. Also, both Microsoft and Netscape permit load-balanced and redundant architectures, with interproxy communication via the CARP and ICP protocols. Furthermore, each of these products has a well established API allowing for extensive customization via the coding of new plug-ins.

Comparison Matrix

FIG. 9 is a comparison matrix of various features in accordance with a preferred embodiment. In accordance with a preferred embodiment, a solution using Microsoft Proxy Server 2.0, or Netscape Proxy Server 3.5, depending on our partnerships. Use customized browser for branding (either $3^{rd}$ party, like Surf Monkey), or something homegrown (using Mozilla source code or Micrososft IAK or APIs). Leverage $3^{rd}$ party childrens 'portal' site, such as Disney's Dig or Yahoo's Yahooligans rather than maintaining independent lists of 'start sites'. Not only will this reduce costs, but we can likely realize some sort of additional revenue stream by partnering with one of these providers.

Remote Access

There are several compelling sales messages associated with remote access. This allows teachers to prepare lessons from home. It might allow students to do their homework online, thereby obviating 'the dog ate my homework' scenarios. It also potentially provides access to educational content for children who are disabled or ill. The thin-client architecture employed in the Managed Education Network is perfectly suited to remote access scenarios. The hardware and operating system requirements for all remote access terminals are very low, enabling students, teachers, and school administrators to access modem applications with the PC they may already have at their house.

The most difficult part of enabling remote access will be ensuring adequate network connectivity between remote locations (homes, libraries, etc.) and the AC-MEN data center. Because of the relatively low bandwidth requirements, connectivity is possible over a variety of access media (albeit with varying performance); in fact, heterogenous remote access architectures can be developed, as the ICA protocol stream will run over a variety of network types. The challenge is to develop and sell a remote access solution that serves as wide a customer base as possible, is easy to implement and maintain, and is cost effective.

Requirements

"Universal" Geographic Availability

All students, teachers, administrators, and community members should have a means to access their desktop remotely, regardless of where they live or which carriers currently provide them with service.

Security

All authorized users should be able to safely and securely access educational and adminstrative data and applications remotely; no unauthorized users should be able to access these data or applications, or prevent authorized users from doing so.

Access Technologies

These include running an ICA client over a public, ISP-managed, network. We should also seek to understand the capability differences and required infrastructure between standalone and web-browser based clients. These architectures and client types potentially serve a wider customer base, with easier installation and support, for lower cost, than our current private analog dial-in solution provides.

Analog Dial-Up

The technologies that form the core of the thin-client paradigm were originally developed to enable remote control access over standard dial-up lines (at the time, operating at 14.4 Kbps). At such low connection speeds, these technologies provided all the functionality of the desktop from remote locations, but certainly not the experience. Clicking GUI widgets (particularly drop-down boxes) would introduce a noticable lag time. This sort of performance would be unacceptable if delivered by an application on the local desktop; in a remote control situation, users were able to overlook mediocre performance, particuliarly because the alternative was likely a long drive into the office at inopportune hours.

Since those early days, a few developments have changed the playing field. Connection speeds have slowly crept up; the adoption of the V.90 standard has meant that analog dial-up downstream rates of 40 Kbps or more are quite common. These larger pipes mean that the GUI sluggishness experienced in standard application usage is much less severe. However, in this same time period, the Internet has also emerged as the 'killer app'. The graphically intense nature of the World Wide Web makes performance over a low bandwidth network less than ideal. This problem is exacerbated when users have to scroll down a page; this requires the screen to be redrawn and sent over the dial-up connection very frequently, increasing bandwdith requirements. The upshot is that users typically percieve worse performance when browsing the web over a dial-up connection to a MultiWin server than they would if accessing Internet content over the same dial-up connection from a local browser.

Despite these performance issues, analog dial up is still a very viable remote access option. While the experience at home is generally worse than it would be in a school, the functionality is identical. Analog Modems are inexpensive, supported by nearly every conceivable hardware and operating system platform, and relatively easy to configure. Telephone lines (at least domestically) are, by definition, universal.

ISDN Dial-up

Integrated Subscriber Digital Networking (ISDN) is a technology wherein digital signals, rather than analog, are exchanged between the residence (office, library, etc) and the phone company central office (CO). This effectively raises the throughput over a normal pair of copper wires universally deployed to 128 Kbps, which is more than adequate for several concurrent thin-client sessions.

The problems with ISDN are largely due to its limited availability. Although this technology was invented at about the same time as disco, the large infrastructure investments required by telephone companies (replacing all analog switching gear with digital equivalents) led to very slow deployment. ISDN terminal adapters are more expensive than their modem counterparts, as are the usage (per-minute) fees.

Cable Modems

Recently, efforts have begun to leverage the coaxial cable used to broadcast Cable Television to many homes as a broadband network media. Data throughput rates over typical implementations varies between 50 kbps to 1 Mbps, and hence could certainly be used to connect small schools, as well as home users, to the data center backbone.

However, widespread adoption of cable modem technology faces several large challenges. First and foremost, a high quality two-way hybrid fiber-coaxial (HFC) network needs to be run to the premises. This requires the provider to supply approximately $250 worth of equipment over and above normal one-way Cable TV (CATV) networking. Note that extremely rural areas may not even have the required CATV infrastructure. Some providers have been deploying HFC networks aggressively, but overall they are still far from commonplace; widespread distribution is likely several years away. Al so, no standard implementation yet exists: equipment, services, and pricing is still very proprietary.

Lastly, because cable modems are implemented using a shared broadband medium, there are some security concerns. It remains to be seen how severe these issues are, and what technological solutions will emerge to overcome them. Using VPN technology should provide more than adequate security for our users.

xDSL

Another recent effort to greatly improve data connectivity to the home involves leveraging the same pair of copper wires used by traditional analog and ISDN. Digital Subscriber Loop is an alternative digital standard which makes use of asymmetric data distribution properties to achieve very high downstream throughput rates.

Like cable modems, xDSL technologies face huge hurdles. The shocking lack of standardization in implementations has led to an alphabet soup (ADSL, HDSL, RADSL, VDSL, IDSL, etc.) of different, proprietary, incompatible, schemas. There are severe distance limitations between the residence and the CO. And carriers have only just begun installing the back-end, DSL access multiplexors (DSLAMs) necessary to support this service. It remains to be seen whether either cable modems and xDSL deployments (or both) will succeed, of if they will spawn another overhyped and underutilized access technology, like IDSN.

Internet

The above approaches involve leveraging a private or, more lkely, semiprivate access infrastructure, most likely built and maintained by our carrier/telco partner. It is also possible to remotely access a centralized, thin-client/server desktop over a public infrastructure, the Internet. In many cases, students and teachers already have Internet access from remote locations (sometimes, this access is subsidized/sponsored by educational agencies already). Leveraging this connectivity instead of maintaining a separate, parallel, access infrastructure is potentially a large cost savings, in addition to being much easier to install and support.

There are, of course, tradeoffs involved in using the Internet as a access medium. No performance guarantees are possible; latency will vary widely depending on ISPs, backbone providers, and instantaneous traffic conditions. Security is also a large concern; precautions must be taken to ensure that unauthorized or malicious attempts to access system resources and data or deny service to legitimate users are thwarted. Such precautions probably include careful configuration of choke routers and firewalls, and authentication via Virtual Private Networking (VPN) technologies. Note that VPN technologies are highly proprietary, and evaluation and selection will depend largely on the security architecture implemented by our carrier provider.

FIG. 10 is a comparison matrix of various communication features in accordance with a preferred embodiment.

In accordance with a preferred embodiment, Internet connectivity is used to enable users to remotely access their educational desktop remotely over the Internet. Carrier analog dial-up services are leveraged rather than installing/maintaining private POPs. In accordance with a preferred embodiment, the following dial up access functions are provided by the carriers:

PPP connection dynamic IP address allocation, maintenance of dial-up platform, authentication/security implementation (RADIUS, TACACS+, etc.)

upgrade of network capacity, support for routing private IP addresses,
disaster recovery,
p.01 Grade of service,
user account management function,
help desk support,
management reports
All customer-facing support (installation, troubleshooting, etc.)
Investigate offering alternative carrier-hosted dial-up services (such as ISDN) as a option
Use Authentication/VPN technologies to prevent abuse
Set expectations of decreased performance over Internet/ Analog Dial-up with users prior to deployment Multimedia It has become increasingly obvious that supporting the information services needs of the educational sector is far different than supporting those same MIS needs in corporate environments. One important differentiation is the simple nature of the information services it is necessary to provide; the office suites and productivity applications that form the mainstay of the 'traditional' business user's computing desktop are but one (albeit important) element in an educational solution. Teachers and students also require access to specialized content and applications whose very nature presents new delivery challenges.

Objectives

Support Multimedia Rich Educational Internet Content

Many educational sites on the Internet deliver graphically rich content via 'plug-ins', such as Shockwave or RealAudio. While the limited throughput and relatively high latency of the Internet means that the quality of this content is relatively low, in most cases it is still much higher than the standard thin-client data stream can support. That is, multimedia Internet content viewed on a standalone workstation is of better quality than on a thin client device. In most cases, however, this content is still usable (now that audio delivery is supported in certain configurations).

Support Multimedia Rich Educational Applications

Educational software packages (including reference works like MS-Encarta) often make use of high quality multimedia content. Quality rendering of this content is often necessary to successful usage of these applications. The new breed of digital reference works include audio, video, and even 'virtual reality' content, in addition to the 'stuffy' text to which society been shackled for the last several millenmia, education packages (including learning games like 'Math Blaster' or 'Carmen Sandiego') often have lavish graphical and audio interfaces. In an effort to entice students into consumption of content, increasingly 'flashy' and 'absorbing' contexts are being developed. Studies have shown that programs that 'reward' correct answers or responses with a multimedia treat are rather ineffective in promoting true, lasting learning; nevertheless, these sorts of applications are very popular with teachers, parents, and students alike.

Support Distance Learning

The learning systems of tomorrow are likely to have even greater interface requirements. The concept of 'distance learning', wherein true content experts can remotely deliver lessons that are ignored by students irrespective of geography, is increasingly finding its way into visions that describe the schools of the future. These sorts of systems typically require full motion video delivery; in some scenarios, upstream video broadcasting is also necessary. Note that some forms of 'distance learning', such as training packages like those offered from CBT Systems, don't require such high-end multimedia delivery. This sort of moderation is quickly falling out of favor.

Technologies

Standard, Thin-client Architecture

The thin-client remote control technology employed by Citrix and Microsoft works by establishing a number of data channels between the client and the server. The screen display data channel uses a protocol that only allows for 256 colors, and has significant latency that is in practice often limited by network conditions. Even under ideal conditions, however, this 'ThinWire' protocol cannot display rapidly updating graphics, such as those found in animation or video clips. The WinFrame product from Citrix does not include an audio data channel; therefore, remote ICA clients connected to a WinFrame server cannot play sound from applications running on that server. Sound is of course an important element of any definition of multimedia. Sound is available for remote ICA clients connected to a Windows Terminal Server/Metaframe platform.

Out of Band, Parallel Video Distribution

It is possible to deliver improved multimedia capabilities via a parallel architecture; for example, the CorelVideo product from Corel. This solution is a delivery vehicle for traditional video content (NTSC/PAL). That is, any traditional analog video signal (from VCR, Cable TV, even Video Conferencing with the right equipment) can be delivered to the 'desktop' via an unused pair inside a Cat3/Cat5 RJ45 cable. One configuration of this solution is a Linux-based thin client with a built-in video CODEC. The thin client has both a standard data network connection, and an analog video input. A software package 'switches' between traditional 'thin-client' and 'video' modes. The data and video cables are both connected to a splitter, which muxes the signals' together over the same physical RJ45. This runs (not more than 300–500 ft) to the wiring closet and into a Corel proprietary patch panel, where the data channels are demuxed and patched into the hub/switch, and the video channels run over a separate trunk line into a proprietary Corel Video Server with line cards. This server serves up MPEG encoded video, or is connected to VCRs or standard Cable Television, etc. If dark fiber is available, you can trunk servers together in multiple locations.

This solution does not fulfill our requirement to be able to serve graphically intensive applications in-band. It is not well suited to a centralized architecture, because there is no efficient way to centrally manage video content (not only would it be cost prohibitive to trunk all servers in schools to a centralized data/video center, but dark fiber is simply not available for wide area links from most carriers.) Another alternative involves using digital video sources, such as MPEG, rather than analog. This would at least enable wide-area, centrally managed content, and would obviate the need for changes to the physical infrastructure. Thin clients from vendors such as Tektronix enable this sort of solution. Unfortunately, this also would not enable graphically intensive applications in-band.

Locally Served Thin Clients (DirectICA)

In the absence of working, centrally-managed thin client solutions that enable multimedia delivery, it may be possible to enable much increased functionality via a distributed thin client architecture. This would preserve most of the simplicity of the user devices, a guiding principle towards lowering cost of ownership, but would distribute server complexity to remote sites. These servers could be locked down (logically and physically) to make them far easier to support than local desktops.

One way to accomplish this is via the DirectICA solution available via WinFrame and Metaframe. A local server running either WinFrame or WTS/Metaframe can be outfitted with several multiport VGA adapters. These adapters deliver analog video signal (in much the same way that the CorelVideo solution does) to thin client-like devices up to 300 ft away. Because these remote devices are literally nothing more than user interface terminals, they can display video output with the same fidelity as a locally attached monitor.

It may also be possible to deliver analog (NTSC) video content from sources such as broadcast and cable television, VHS VCRs, Laserdisc and DVD players, etc. Several TV Tuner & Video Capture cards are supported under Windows NT4.0, including the Hauppauge WinCast. Testing to determine compatibility under Windows Terminal Server and Metaframe, as well as interoperability with the DirectICA video cards, would be necessary to determine the overall feasibility of this solution.

Thick Multimedia Terminals

By resorting to a distributed architecture, its possible to enable nearly all conceivable multimedia functionality. However, the cost end effort required to implement and support this sort of architecture is potentially prohibitive; this is in fact the architecture that we advocate migrating away from in the first place.

FIG. 11 illustrates a comparison matrix of thin client features in accordance with a preferred embodiment. In accordance with a preferred embodiment, a locally served thin client architecture is enabled utilizing DirectICA. Local servers are used for print queues, DHCP, etc. to improve perforformance, functionality, and stability of other local 'traditional' thin clients. Analog (NTSC) video is delivered in accordance with a preferred embodiment over DirectICA infrastructure.

Wireless Detailed Description in Accordance with a Preferred Embodiment

Introduction

Several applications call for network access in areas where traditional wired connectivity is unsuitable. There may exist physical or economic barriers to running network cable, or users may require flexibility not afforded by wired connections. Typical scenarios include a remote building with a relatively small number of network users on a corporate campus, or a warehouse floor where inventory must be performed. In certain scenarios, these needs are met via the installation of a Wireless Local Area Network (WLAN).

A number of factors influence the design decision to institute local area wireless support, as opposed to wide-area, "cellular"-type technologies. Where business requirements allow it, local area technologies typically over greater throughput and more seamless integration into existing networks and systems. WLANs may offer greater end-user device options. Sending sensitive data over public carrier-based solutions may be unacceptable. Whatever the reasons, it is important to bear in mind the relative immaturity of wireless technologies in general. The state of the art is constantly evolving, for both local and wide area technologies, and that future developments made alleviate some of the above concerns. For example, satellite-based technologies will make global deployments extremely feasible (at the cost of increased expense and lower throughput).

Note that WLAN technologies certainly have their limitations. At present, they offer very limited throughput (less than 2 Mbps/user) at high costs (5 times the price of wired connections). Additionally, cross-vendor interoperability is non-existent, resulting in an extremely fragmented and unstable marketplace. In general, WLANs are suited only for specific, niche applications; i.e., vertical rather than horizontal deployment.

Design Methodology Guidelines

Ideally, WLAN design would be a three phase approach. A preliminary design should be produced, the conclusions should be tested in a physical on-site survey, and the survey results should be used to revise and refine the design.

Preliminary Design

The preliminary WLAN design does not necessarily require physical access to the area to be supported. Establishing good lines of communications with important user contacts, and acquiring key documentation, should enable much design work to occur from remote locations.

Determine User Requirements

A number of different wireless connectivity scenarios exist as a function of user requirements. Two examples include the highly mobile equipment maintainer who requires seamless wireless connectivity across a large contiguous area, and the small remote facility with no existing communications capability that requires LAN access. These, and other, disparate scenarios may require vastly different equipment and architectures. It is essential to accurately determine user requirements before beginning a WLAN design, and to incorporate any changing requirements in a logical and timely fashion. Note that gathering user requirements prior to beginning the design phase will enable detection of any unfeasible demands, and allow the opportunity to set realistic expectations.

Acquire Physical and Network Maps

Getting an idea of the size and shape of the area to be covered, as well as the approximate location of any major obstacles, impediments, and potential mounting locations, is essential to performing a wireless network design.

Furthermore, the WLAN will undoubtedly require integration with the existing wired network installation. The wired network topology will strongly influence WLAN design decisions. For example, wireless clients will typically only be able to roam between access points on the same LAN segment; routers will impede the seamless 'hand-off' to a new access point. Getting accurate network maps is a crucial step in analysis and design of the wireless/wired network interfaces.

Perform Product Evaluation and Selection

Based on user requirements, physical constraints, and network topology, it should be possible to select the WLAN vendor and products that will be implemented as a part of the total solution. Note that the current state of the art does not allow for cross-vendor interoperability; selection of a WLAN vendor will determine which client devices will be able to use the fielded network. It is also important to consider several non-technical factors when choosing a vendor; the long-term consequences of this decision will require selecting a vendor with adequate support, and who is likely to survive the market shake-out that will occur over the next few years.

Each WLAN vendor is likely to have several product offerings to meet different requirements. For example, a vendor may offer products with different transceiver strengths (100 mW vs. 500 mW) or different network interfaces (Ethernet vs. Token Ring). Early determination of all relevant and realistic products will enable administrative work and detailed design to begin.

Obtain Frequency Approval

WLAN devices utilize portions of the radio spectrum to communicate. Their use may be governed by local, regional, or national regulatory bodies or agencies. It is extremely important to coordinate with all applicable bodies before attempting to design and implement a WLAN. Note that the low power employed by typical WLAN transmitters will ease regulatory concerns. Also, most WLAN products currently shipping operate in 2.4 Ghz range, which has been set aside by many national agencies for unlicensed Industrial, Scientific, and Medical commercial utilization. Certification may require complex paperwork with lengthy approval cycles to be filed by equipment manufacturers or integrators.

Perform Initial Research and Testing

Only by learning a great deal about the theoretical and practical capabilities of the relevant access point and antenna options can efficient and accurate detailed design commence. Exact capabilities will depend a great deal on environmental conditions, but the WLAN architect should become very familiar with generalized range and throughput properties, as well as understand the strengths and limitations of the hardware and architecture in question. There is no substitute for hands-on experience with the equipment, which can be obtained prior to site surveys and implementation, at least in part, by testing the actual equipment to be used in a staging area.

Prepare Preliminary Design Document

With the above information, it is possible to produce a preliminary design showing projected locations and configurations of WLAN equipment. For example, rough templates of the approximate coverage area associated with each access point/antenna pair can be constructed to the scale of available physical maps. These templates could then be overlaid on the maps in question to assist in determination of optimal access point/antenna placement. The design goals will vary from installation to installation, but the following factors are likely to have significant impact:

1. Minimize number of access points needed to cover a given area
2. Place access points to facilitate in-field diagnostics and maintenance
3. Place antennae to minimize field effects ('RF shadowing', 'Multipath', 'Near-far', 'Hidden receiver' phenomena) and improve network performance
4. Place access points to ease integration with wired network Site Survey After completing a preliminary WLAN design approach, the physical site should be surveyed to test and identify variances with this design.

Obtain and Coordinate Resources

Several relevant resources are required to conduct a thorough and complete site survey. Also, there are potentially several administrative functions that should be performed prior to arrival on site. Coordination may include the following steps 1. Obtain permission to enter the site, including all areas to be serviced by the WLAN or slated to host equipment
2. Schedule sufficient time with appropriate human resources, such as those individuals who will be performing the actual survey, site custodians, and network managers
3. Obtain appropriate equipment to support in-field evaluation of WLAN performance. For example, if plans call for access points/antennas to be mounted in unusual places, schedule resources to enable temporary mounting of representative equipment in these locations.

Perform Walkthrough of Planned Installation

A thorough physical inspection of the areas to be serviced by the proposed design may yield important information that will lead to design modifications. For example, areas may have unexpected vegetation that would impact radio signal propagation, or locations proposed to host access points may prove unsuitable.

Obtain Relevant Documentation

Detailed power, network, and structural documentation should be obtained to flesh out detailed design requirements. This documentation should be carefully reviewed for issues that will impact design decisions.

Perform Field Performance Testing

Representative WLAN equipment should be temporarily mounted in each location. Detailed and comprehensive performance statistics should be captured using a benchmarked test platform. The effective coverage area served by each access point/antenna pair should be mapped. Also, representative throughput information should be captured. Several scenarios can arise where strong radio signal strength does not produce correspondingly high effective throughput rates; this usually indicates the presence of undesired radio field effects, such as multipath.

Detailed Design

After conducting the site survey, a finalized detailed design can be produced. Several of these steps can occur in tandem with the site survey; preparing documentation and comparing with expected results can lead to an iterative process that produces the best design quickly.

Prepare Site Survey Report

Timely and through documentation of all information gleaned during the site survey will expedite the detailed design process. It will also prove invaluable during the implementation and testing of the WLAN.

Compare Site Survey Results With Preliminary Design

The results obtained during the site survey should be carefully compared with the expected results around which the preliminary design was based. Variances should be carefully noted. If the observed results are unsatisfactory, the preliminary design should be revised, and additional testing should be performed.

Prepare Detailed Design Document

The detailed design should be a revision and expansion of the preliminary design. If the results observed during the site survey are unsatisfactory, the preliminary design should be revisited and revised to achieve desired performance. Additional testing may be required. Additional detail should be provided with regards to physical WLAN installation requirements, WLAN-wired network integration details, and expected serviceable WLAN coverage areas and qualities.

Prepare Installation Plan Document

A detailed document to enable an efficient and flawless installation of WLAN hardware should be produced. In most cases, the personnel responsible for planning and design of the WLAN will not be responsible for performing the actual installation; in many cases, they will not even be present. Therefore, it is absolutely critical that this document be produced with great care, and with an eye towards clarity.

Optimize Channel Utilization

Most WLAN systems have several channels within the prescribed frequency band. These channels can be used to maximize the available network bandwidth. WLAN equipment tuned to the same channel will share the same bandwidth; therefore it is of great interest to minimize the number of radio units employing a given channel. Channels can be efficiently recycled with sufficient separation.

The number of available channels will depend on the WLAN vendor; note that it is not necessarily a given that a greater number of channels available will mean a greater practical throughput within a given area. For example, frequency hopping spread spectrum techniques generally rely on designating several orthogonal subsets of frequency hops from the total number available in the given bandwidth. Squeezing additional channels into the same total band will reduce the orthogonality of the channels and increase the probability that cross-channel interference will occur leading to throughput reduction. It is the responsibility of the WLAN vendor to optimize the total number of available channels, but it is the responsibility of the WLAN implementers to utilize these channels effectively.

In an optimal setup, each service area (be it user-servicing access point or wireless bridge link) would have its own channel. This is not always possible. A design criteria should be to reuse channels for area/links that are physically separated and of lesser importance. Effective channel utilization can be reduced to a relatively simple algorithm.

1. Identify all access point locations and service areas on a map of the coverage area. Note that each wireless bridge link has both a master and a station. While the channel is not configured on the station, it still receives and transmits on that channel and hence must be considered in the channel planning stage.
2. Label each service area with a unique channel identifier.
3. When channels are depleted, seek to reuse channels in service areas that are physically disparate. It may take several revisions to produce an optimal channel set up. This is a mostly trial and error process, but guidelines for efficient allocation may be available in the 'cellular' section of wide area wireless networking resources, as this is essentially the same problem wide area carriers deal with in their "cellular" installations.
4. Construct table of access point configuration information and check for consistency.

Design Roaming Strategy

If large contiguous areas are serviced by multiple access points, it is often necessary to ensure that efficient roaming occurs. 'Roaming' is the process by which a mobile WLAN user is seamlessly 'handed-off' from one access point to another. Several factors will influence the ability to roam: not only must the mobile WLAN unit be properly configured to communicate with all relevant access points at the physical and data link layers, but the WLAN unit must also be configured to communicate with the wired LAN at the network layer. The practical implications of this will depend on the WLAN product and network topologies involved, but it may mean that 1. All roaming radio units must have the same logical 'domain' and security settings, and
2. All roaming radio units must be located on the same logical network segment.

For example, if two access points are located on different network segments, it is unlikely that roaming will be possible. The network address of the mobile unit will be valid for one segment, but not the other, and correct routing will not be possible. Note that several technologies to circumvent this problem (Mobile IP, Mobile IPX, IPv6) are in development; few of these solutions are currently available on a wide-spread basis.

General Frequency Issues

Frequency issues surround nearly all details of WLAN performance and implementation, including signal propagation, maximum data throughput, and administrative licensing and coordination. A number of different and incompatible frequency ranges and modulation schemes are employed by various WLAN implementations; in fact, three are specified in the IEEE 802.11 'standard'. Successful WLAN design demands a thorough understanding of frequency and its myriad implications.

Signal Propagation

In general, lower frequency signals have much better propagation than higher frequency signals. Consider the typical car stereo: when sufficiently loud, the low, thumping bass propagates well outside the vehicle, whereas the high treble sounds are completely muffled by the car body. This same effect is evident in WLAN signal propagation. Radios with similar power output that operate at 900 Mhz have better range than those that operate at 2.4 Ghz, which in turn have better range than infrared devices.

Maximum Data Throughput

In general, lower frequency signals have smaller theoretical data throughputs than higher frequency signals. While part of this is attributable simply to the smaller number of bits that can be modulated over the simpler carrier wave, the problem is compounded by the relatively small spectrum bandwidth devoted to WLAN applications in the crowded, lower frequency ranges. Radios operating at 2.4 Ghz have higher throughputs than those operating at 900 Mhz, and WLAN vendors are looking to the 5 Ghz band to provide even higher speeds.

Licensing and Coordination

In general, lower frequency signals face greater danger of interference than higher frequency signals. Applications using the 900 Mhz band are actually quite common, owing largely to the low cost of the radios required to broadcast in this range. This greatly increases the effort needed to ensure that the WLAN fails to interfere with, or be interfered by, other unlicensed wireless devices, such as cordless phones. 2.4 Ghz radios have been newer to market, and have been relatively well protected by regulatory agencies; these devices face relatively low competition for airwaves. Infrared signals are employed by extremely common remote control devices; significant testing and coordination is a prerequisite to successful deployment. These factors are of course colored by the signal propagation in the relevant band (see above).

Bands and Encoding Schemes

Spread Spectrum

Direct Sequence Spread Spectrum

This is a technique by which the narrowband data signal is transformed by a wideband spreading signal known to both receiver and transmitter, resulting in a composite wideband signal which is then transmitted. The inverse operation is performed by the receiving station to regenerate the data signal. This encoding scheme allows for channels with relatively high throughput rates, typically around 10 Mbps. However, the 'stacking' of these channels in the frequency band is inhibited by technical and regulatory legislation, typically resulting in less aggregate data throughput than possible with other spread spectrum techniques. In addition, this technique is fairly sensitive to interference, and environmental conditions that may only lower the throughput of some radios may completely preclude the use of DSSS-based devices. Lastly, the wideband signal transmission results in high power consumption, which is often unsuitable for wireless, mobile, applications. DSSS was quite common in first generation WLAN implementations, but has generally fallen out of favor with the wireless community. Lucent is the industry-leading DSSS radio vendor.

Frequency Hopping Spread Spectrum

This is a technique by which the transmitting and receiving stations very quickly hop from narrowband frequency to frequency in a pre-orchestrated pattern. This encoding scheme allows only for relatively low per-channel throughput rates, typically less than 2 Mbps. Unlike DSSS, however, properly designed FHSS channels can be stacked fairly densely, allowing for a large number of orthogonal channel hopping patterns to fill the same composite wideband spectrum and resulting in higher aggregate data throughput rates. This technique offers much higher interference immunity than most DSSS implementations, and consumes less power. Many former DSSS radio vendors now focus on FHSS techniques.

900 Mhz

This was the first band utilized by spread spectrum WLAN implementations, ranging from 902–928 Mhz. Typical implementations utilixed DSSS encoding, and experienced ranges of 100 m with throughputs of 500–800 Kbps. The 900 Mhz band quickly became saturated by unlicensed commercial devices ranging from cordless phones to garage door openers, and the relatively small bandwidth allocated to commercial devices left little room for performance enhancements.

2.4 Ghz

As the 900 Mhz band became increasingly crowded, and the inherent throughput limitations became increasingly evident, many WLAN vendors began looking to the 2.4–2.4835 Ghz band to provide much needed room for growth and expansion. By 1996, this became the de facto standard for spread spectrum implementations. Many of the propagation issues involved in moving to a higher frequency were overcome by focusing on higher power radios, still allowed by FCC Part 15 specifications for unlicensed operation. 2.4 Ghz FHSS and DSSS physical layers are specified as part of the IEEE 802.11 standard (see below).

5 Ghz

No sooner than vendors standardized on 2.4 Ghz and products began to achieve some degree of maturity, than the industry began looking for ways to further increase throughput. It quickly became obvious that even large data modulation developments would not allow per-channel FHSS throughput of greater than 8–10 Mbps in the 2.4 Ghz band. A standard called 'HiperLAN' was published in Europe in 1997 aiming at providing very high data rates (~25 Mbps) for short distances using the open 5 Ghz spectrum. Adding to the incentives, the FCC recently allocated a large portion of the spectrum, from 5.15–5.35 Ghz and 5.725–5.825 Ghz, for unlicensed consumer applications. WLAN vendors are beginning serious research and development efforts in this band, and expect to release 5 Ghz products by 1999.

Infrared

Infrared WLAN equipment operated at 350 Thz, just below visible light on the radio spectrum. As such, most of the properties associated with light are applicable to IR WLANs. Their signals do not propagate through barriers, such as walls, and require higher power to 'spread' over a wide angle and fill a room. As such, IR WLANs are best'suited to point-to-point links and for short distance temporary ihtra-room connectivity. Many consumer devices are equipped with IrDA ports to enable a sort of short range IR WLAN. Infrared is one of the physical layers specified in the IEEE 802.11 standard (see below).

WLAN Standards

IEEE 802.11

On Jun. 26, 1997, the IEEE approved standard 802.11, dictating physical and media access control layers for wireless LANs. This standard in development for over seven years, aims at producing the sort of interoperability present in wired LAN technologies (such as Ethernet) necessary to increase competition, lower prices, and prompt widespread adoption. Unfortunately, this standard defines 3 different physical layers (2.4 Ghz DSSS, 2.4 Ghz FHSS, and Infrared), specifies only low speed connections (less than 2 Mbps), fails to include contention management and inter-access point communications, standards, and includes several optional implementation details. The result is that IEEE 802.11 will probably not spawn true, useful, interoperability. It has, however, increased public awareness of WLAN technology, and many vendors will likely work together to 'fill in th holes' in the standard and work towards interoperability on their own.

OpenAir2.4

Disappointed by the results of the IEEE 802.11 effort, a coalition called the Wireless LAN Interoperability Forum (WLIF) formed to support WLAN technologies. Unlike IEEE 802.11, this is a complete end-to-end standard completely specifying everything necessary for interoperability using a 1.6 Mbps, 2.4 Ghz FHSS implementation. Also unlike IEEE 802.11, however, this is primarily a single-vendor effort with support from OEM partners.

MobileIP

Existing wireline-based LAN technologies used by WLAN implementations do not easily allow for client mobility, one of the primary reasons to implement a WLAN. For example, were a client to roam from an access point on one subnet to an access point on a different subnet, its IP address would no longer-be valid and network communication would be inhibited. A standard called MobileIP has been adopted allowing for the automatic re-direction of network traffic to mobile clients. This requires a specialized, proprietary, and expensive IP stack at the client, and the deployment of 'foreign agents' which sense the movement of the client and 'forward' all designated packets accordingly. IPv6 has built-in mobility awareness. It remains to be seen whether IPv6 will be implemented quickly enough so that most WLAN applications can avoid the complications of MobileIP altogether.

WLAN Technical Details in Accordance with a Preferred Embodiment

Product Details

Technical details for a Wireless LAN architecture are described in accordance with a preferred embodiment. All RangeLAN2 products offer 15 non-interfering OpenAir 2.4® Frequency Hopping Spread Spectrum channels in the 2.4–2.483 Ghz ISM band of the spectrum, operate at a maximum data rate of 1.6 Mbps, and meet FCC Part 15 regulations.

RangeLAN2 7510 Ethernet Access Point (AP)

This product is a transparent bridge between a wired Ethernet port and a wireless radio interface. It can be configured through a command line interface accessed via its Configuration, Ethernet, or Radio ports.

| | |
|---|---|
| Ethernet Port: | 10BaseT (RJ-45) or 10Base2 (BNC) |
| Antenna Port: | Reverse BNC |
| Configuration Port: | Serial (DB-9) |
| Radio Power Output: | 100 mW |
| Operating Temperature Range: | −20 to 60 C. |
| Operating Humidity Range | 10–90% |
| Weight: | 1.5 lb |
| Size: | 8.54" × 6.54" × 1.66" |
| Input Voltage: | 10–18V (DC) |

RangeLAN2 7520 Manageable Ethernet Access Point

This product is similar to the 7510 AP-II, but features additional memory to offer enhanced management capabilities and node-caching performance. Its command line configuration interface can also be accessed via analog phone lines through a modem direct-attached to its Configuration point; additionally, it features a Web browser interface accessible via its Ethernet or Radio ports. The 7520 also offers full SNMP compliant remote monitoring and management via its Ethernet and Radio ports using standard 802.1D and proprietary MIBs. Lastly, the 7520 can be configured to distribute software updates to other 7520 access points on the WLAN or wired Ethernet segment.

RangeLAN2 7530 Manageable Token Ring Access Point

This product is similar to the 7520 AP-II, but features a 802.3 Token Ring network interface rather than 802.2 Ethernet.

Token Ring Port: STP (DBP) or UTP (RJ-45)

RangeLAN2 7521 Extended Range (XR) Access Point

This product is not yet shipping, so information is subject to change. It is essentially similar to the 7520 AP-II, but features a 500 mW radio.

RangeLAN2 7550 Extend Point (EP)

This product is not yet shipping, so information is subject to change. It is essentially similar to the 7520 AP-II, but features two 100 mW radio interfaces rather than a radio interface and an Ethernet interface. Its expected power consumption is slightly lower than the 7520.

RangeLAN2 7551 Extended Range Extend Point

This product is not yet shipping, so information is subject to change. It is essentially similar to the 7550 EP, but features two 500 mW radio interfaces rather than 100 mW interfaces.

RangeLAN2 740x PC Card

This product is a Type II PCMCIA transceiver.

| | |
|---|---|
| Radio Power Output: | 100 mW |
| Operating Temperature Range: | −20 to 60 C. |
| Operating Humidity Range | 10–90% |
| Weight: | 31 g |
| Size: | 3.37" × 2.13" × 0.20" |
| Input Voltage: | 5V |
| Power Consumption: | 300 mA transmit |
| | 150 mA receive |
| | <5 mA doze |
| | 2 mA sleep |
| Drivers Included: | ODI |
| | NDIS 2.1, 3.1 |

RangeLAN2 7100 ISA Card

This product is essentially similar to the 740x transceiver, but features an ½ length ISA bus interface rather than a PCMCIA interface.

RangeLAN2 6xxx OEM Products

These products offer similar functionality to the 740x transceiver, but in a variety of OEM integratable form factors. Exact technical specifications will vary from integration to integration, and OEM vendors must ensure adequate performance and re-certify the final product with the FCC.

Other wireless LAN implementations, in accordance with alternative embodiments include:

802.11 Compliant Access Points and NICs

Parallel Port RangeLAN2 adapters

Ethernet Port RangeLAN2 Adapters

Protocol Details

Roaming

'Roaming' is the process by which stations automatically and seamlessly switch to which master they are synchronized. Roaming occurs when the observed signal quality does not meet the predefined criteria. This can happen due to the station physically moving out of range, varying radio conditions, or exceptions such as power failures servicing the master. Roaming does not occur for bandwidth reasons (i.e., a station will not determine that the current channel is too crowded and attempt to synchronize with another master).

Two user definable parameters control station roaming behavior. Roaming can be wholly disabled, and the 'Roam Speed' can be set to 'Fast', 'Normal', or 'Slow'. 'Normal' roaming occurs when a transmission error percentage threshold is exceeded, and a new master is found with significantly improved signal qualities. 'Fast' and 'Slow' roaming speeds are less selective about the new master, and have lower and higher error thresholds, respectively. The exact error thresholds and characteristics that determine a 'significantly better signal' are not normally user-definable.

When the number of transmission errors exceeds a certain level, the radio first 'falls back' into a Binary Phase Shift Keying (BPSK) modulation scheme, which effectively cuts the throughput in half the normal mode of operation is Quad Phase Shift Keying (QPSK). If conditions do not improve, or worsen (note that,the exact algorithm is proprietary), the radio eventually attempts to roam. BPSK is also used for all broadcast packets, such as ICMP notices. Because of this, 'ping' is not an ideal network diagnostics tool.

Roam speed should ordinarily be set to 'Normal'; this is the only setting that ensures that any new connection is better than the one previously abandoned. In an area serviced by many masters, 'Roam Speed' should be set to 'High' to allow stations to switch immediately after the signal degrades. In an area serviced by relatively few and far between masters, the 'Roam Speed' should be set to 'Slow' to encourage the station to maintain a degree of connectivity, albeit poor, with a master. If coverage is truly sparse, stations may attempt to roam and lose all connectivity whatsoever. In accordance with a preferred embodiment, stations sample link conditions if 'Roaming' is enabled, transmission errors are recorded, if the transmission error rate climbs above a certain defined level, stations fall back to a reduced throughput mode. If the transmission error rate climbs above the threshold defined by roaming speed, stations look for a new master. If 'Normal' roaming is enabled, the new master must have improved signal qualities, or it is rejected. If 'Fast' or 'Slow' roaming is enabled, the first new master is accepted regardless of signal quality. An IPX packet is sent from the new access point to the old one informing it of the roam.

Note that access points configured as stations, as in a bridging topology, have several additional roaming parameters. An ordered list of masters with whom to attempt synchronization can be defined by setting the 'First Master to Sync With', 'Second Master to Sync With', etc. parameters. This allows default and fall-back WLAN topologies to be explicitly defined to allow for planned redundancy without compromising network performance.

Collision Avoidance (CSMA/CA)

Normal collision detection algorithms, as employed by wired 802.2 Ethernet technologies, do not lead to efficient or equitable bandwidth utilization: the presence of radio phenomena such as 'Near/Far' and 'Hidden Receiver' reduce the effectiveness of these techniques, prompting the development of a proprietary Carrier Sense Multiple Access Collision Avoidance algorithm (CSMA/CA) in which potential collisions are prevented. Note that the protocol is acknowledged wireless collisions will result in unrecieved and hence unacknowledged packets, prompting a retransmission.

The CSMA/CA algorithm works as follows. All stations are kept in synchronization by the master access point. When a station wants to transmit data, it listens on the channel and waits for an opening. It then broadcasts a Request to Send (RTS) packet, which is very short. This broadcast is heard by all other stations in range on the channel. The access point broadcasts a Cleared to Send (CTS) packet on the channel with the name of the station granted permission, and a length of time for which this clearance is valid. All stations, even those out of range, or hidden, from the original station now know to stay idle for the specified time. The original station then transmits its data in the time allotted (or until its finished, it the data is short). The data is then acknowledged by the master, and all stations are free to send RTS packets as necessary.

Contention Management and Prioritization

CSMA/CA alone does not ensure equitable distribution of bandwidth. If one radio is closer, with a stronger signal, than its peers, its RTS will be more likely to be Cleared by the access point, allowing it to speak freely while other stations' Requests are summarily ignored. A mechanism in accordance with a preferred embodiment utilizes a radio protocol to allow stations to seize the airwaves. Each RTS interval is divided into slots. The number of slots varies depending on a user definable parameter ("MAC Level Optimization") and the number of stations synchronized to the master.

FIG. 8 is a tabular display of the optimization level and synchronization in accordance with a preferred embodiment. Stations select a slot a random from the last half of available positions (i.e., if 'MAC Level Optimization' is set to Medium, stations randomly select from slots 3 and 4). If a station's Request is ignored twice, that station is then allowed to pick from the first half of available slots, thereby virtually assuring its Request will be Cleared. The exception to this rule is when an access point is configured as a station, as in a 'bridging' topology (see Section 1.2.5). Access points are considered higher priority traffic than normal stations, as they are likely to be servicing multiple clients themselves. They are thus permitted to initially choose a slot randomly from the last 75% of available positions (i.e., if 'MAC Level Optimization' is set to Medium, access point stations randomly select from slots 2,3, and 4).

Filtering

A wireless LAN in accordance with a preferred embodiment has the ability to perform some rudimentary packet filtering. This is largely done for throughput preservation; in general there is no need to consume the limited bandwidth offered by WLAN solutions with such chatty traffic as IPX SAP broadcasts. A preferred embodiment filters this traffic at the access point before it is propagated over the wireless network.

Most of the filters are self-explanatory, based on protocol types. One filter offers the ability to filter traffic that neither originates from nor is destined for other wireless products, as determined by the first 8 hexadecimal digits of the MAC address: this feature is enabled by setting 'Filter Fixed Nodes' to on. Note that in most cases, this filter should be on to maximize throughput available to wireless clients. The one exception is when wireless products are used to link two disparate wired networks, as in bridging between buildings.

Access points use the IPX protocol to communicate roaming information. To enable users to roam between access points, you must disable the IPX filter. Access points use a proprietary protocol to exchange version information.

'Bridging'

This is actually an unfortunate term, arising out of necessity. 'Repeaters' are referred to as 'Extended Points'. The term 'bridging' arose historically; wireless point-to-point architectures have been used to link physically disparate networks in the same fashion that 'bridges', were previously employed to link logically disparate networks (which, by circumstance, were usually physically disparate as well). Most WLAN products are bridges, as they all translate from standard wired protocols (such as 802.3 Ethernet) into wired protocols (such as 802.11 or OpenAir2.4). A few perform no protocol translation and merely forward packets from one radio interface to the other. In most respects, access points configured as bridges act as normal stations. Some specialized aspects of the bridging architecture are detailed above, such as the configurable roam list, traffic prioritization scheme, and wired packet filter.

WLAN Security

One argument against implementation of wireless LANs may involve security. There is no doubt that the benefits of wireless LANs come at the cost of decreased network security. In particular, WLANs are extremely susceptible to denial of service attacks by highly committed individuals. However, proper precautions should preserve wireless data and network integrity.

Spread-spectrum techniques call for the transmission of data to occur across several distinct hops in the frequency band. In addition to reducing susceptibility to interference and thereby reducing inadvertent denial of service, this mechanism makes it non-trivial to 'eavesdrop' on a radio channel using 'scanner'-type equipment and intercept data transmission. The architecture utilizes Frequency Hopping Spread Spectrum (FHSS) data transmission with 75 distinct hops in the 2.4–2.4835 Ghz ISM band. Note that committed individuals could still effect a DoS attack by 'jamming' the entire ISM band.

If commercially available products are used in WLAN implementations, it is relatively easy (though non-trivial) to intercept a spread-spectrum channel. A slightly less clumsy DoS attack could be launched by highly skilled individuals by synchronizing to the Frequency Hopping pattern and selectively 'jamming' the frequency in use. Mere acquisition of the radio signal is insufficient to intercept or modify data if this signal is encoded; measures would need to be taken to provide for efficient decoding of this signal. An architecture in accordance with a preferred embodiment utilizes a 20 byte key to encode data in real time using a proprietary algorithm. Note that this encoding is not 'encryption'.

Steps should be taken to ensure that unauthorized user devices do not attempt to access the WLAN. The architecture utilizes an authorization scheme which denies access from units whose MAC address is not listed in the Authorization Table. Attempts to authorize the network from unauthorized nodes are logged. The above steps implement security measures at the lowest levels of the network architecture (i.e., those levels specific to WLAN implementations). The WLAN is still a part of the overall network implementation, and is subject to all relevant network-level regulations and provisions. For example, network traffic originating from or destined for WLAN hosts can be carefully monitored and regulated via network level restrictions, such as packet filtering at appropriate routers. Furthermore, specific measures can be taken at the application level to ensure data integrity. For example, session-level strong encryption (based on the RC5 algorithm) is available via some application software to prevent user authentication and session data transport from being passed 'in the clear'. It should be noted that some of the features intended to prevent unauthorized use of the WLAN, such as port-based MAC address filtering have only recently being implemented in wired networks. FIG. 12 is a table of various communication protocols in accordance with a preferred embodiment.

Figure 14:
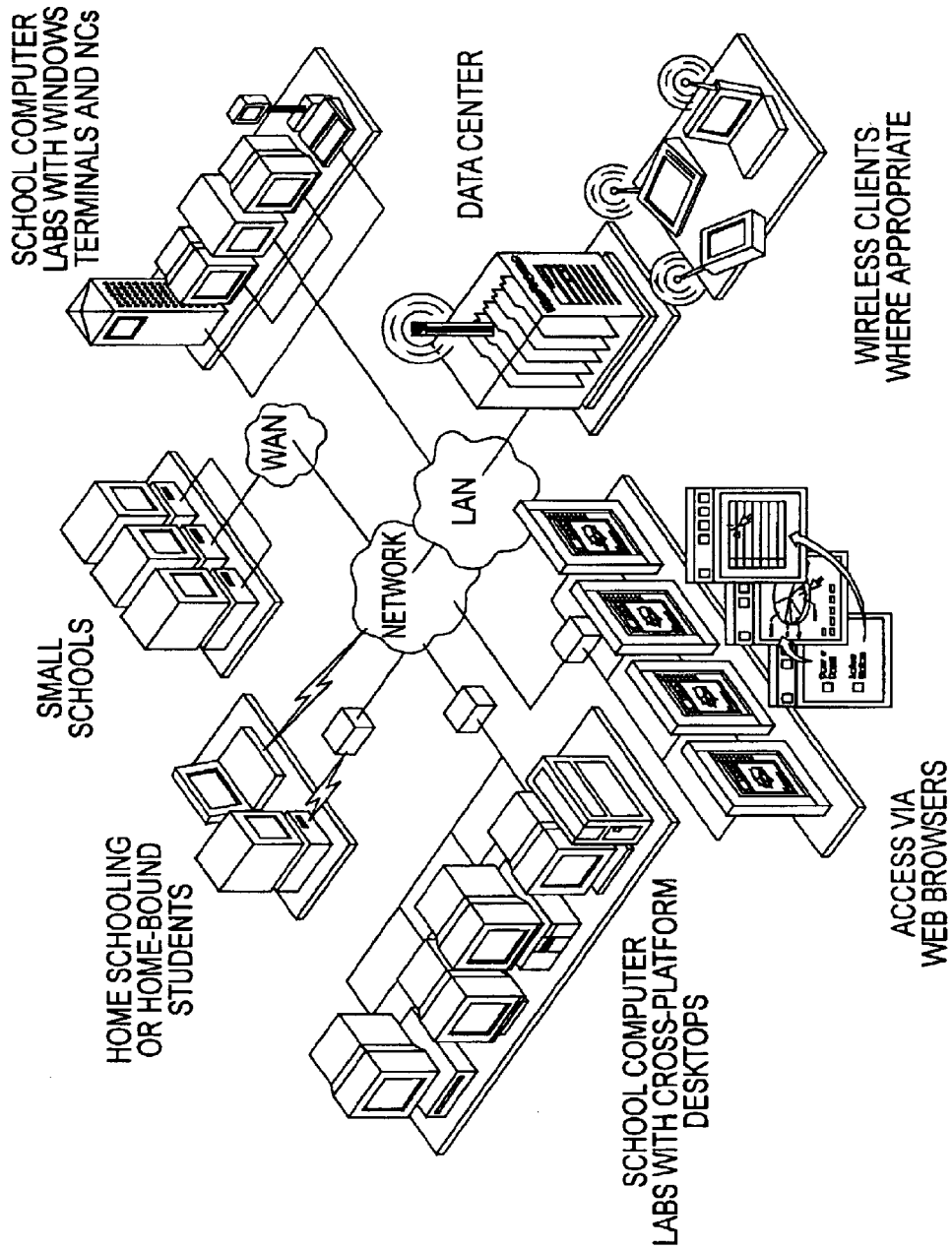
FIG. 14 illustrates a wireless communication architecture in accordance with a preferred embodiment.
Figure 15:
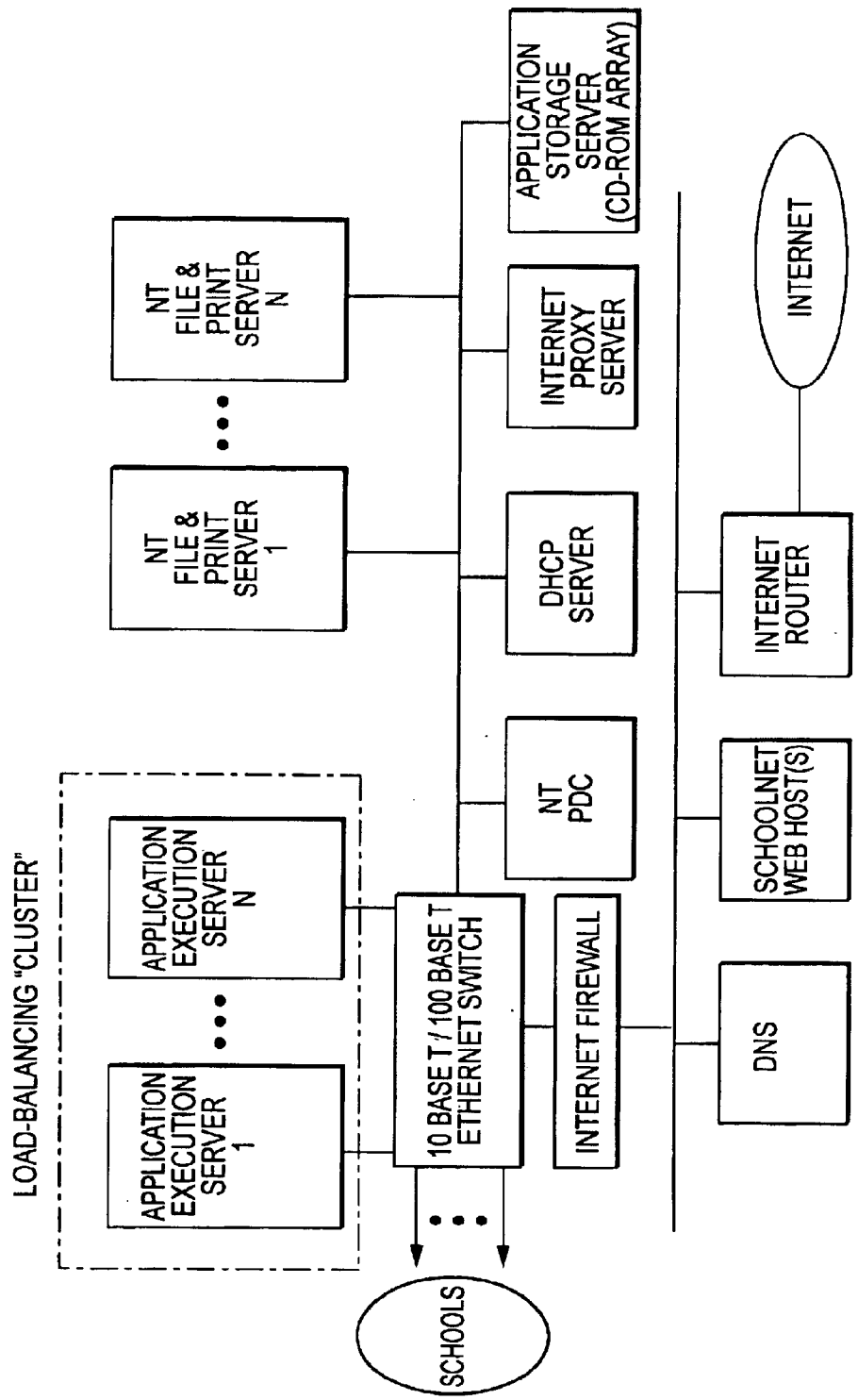
FIG. 15 illustrates a load balancing cluster in accordance with a preferred embodiment.

FIGS. 13A to 13F illustrate various architectures in accordance with a preferred embodiment. FIG. 14 illustrates a wireless communication architecture in accordance with a preferred embodiment. FIG. 15 illustrates a load balancing cluster in accordance with a preferred embodiment.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method of providing a teaching interface between a teacher and multiple students, comprising:
    transmitting data from a teacher terminal to student terminals;
    receiving the data at the student terminals;
    separating the data into execution data and instructional data and utilizing the execution data to display the instructional data at the student terminals;
    grouping the student terminals into a plurality of teams, wherein each team is made up of at least two student terminals for a corresponding number of students;
    allowing the student terminals for each team to interact to make a group decision, for encouraging team participation by shy or otherwise reluctant students;
    transmitting team answer data from one of the student terminals for each of the teams, wherein the team answer data represents the group decision for each team;
    monitoring the team answer data for the instructional data to infer class progress towards a goal; and
    allowing a teacher at the teacher terminal to modify instructional data based on the progress toward the goal.

2. The method of claim 1 further comprising linking information that motivates accomplishment of a goal to the instructional data.

3. The method of claim 1 wherein the teacher can selectively show certain of the student data and the student interactions and analyze such student data and student interactions for each of the students during an instructional session.

4. The method of claim 3 wherein student interactions via the student terminals are at least one of ordered, sorted and used to present statistical analysis to the teacher terminal during the instructional session.

5. The method of claim 1 wherein the transmitting of information uses a wireless network.

6. The method of claim 5 further comprising utilizing thin client technology for the student terminals.

7. A system for providing an electronic classroom system, comprising:
    a teacher terminal which manages a teaching session and modifies instructional data based on progress towards a goal;
    student terminals;
    a network for transmitting information from the teacher terminal to the student terminals;
    a sub-system which separates the transmitted information into execution data and instructional data;
    a sub-system which utilizes the execution data to display the instructional data at the student terminals;
    a sub-system which groups the student terminals into a plurality of teams, wherein each team is made up of at least two student terminals for a corresponding number of students;
    a sub-system which allows the student terminals for each team to interact to make a group decision, for encouraging team participation by shy or otherwise reluctant students;
    a sub-system which transmits team answer data from one of the student terminals for each of the teams, wherein the team answer data represents the group decision for each team;
    a sub-system which monitors the team answer data for the instructional data to infer class progress toward a goal; and
    a sub-system which allows a teacher at the teacher terminal to modify instructional data based on the progress toward the goal.

8. The system of claim 7 further comprising a sub-system which links information that motivates accomplishment of the goal to the instructional data.

9. The system of claim 8 further comprising a sub-system which allows a teacher via the teacher terminal to selectively show certain of the student data and the student interactions and analyze such student data and student interactions for each student during an instructional session.

10. The system of claim 9 further comprising a sub-system which allows multiple students interactions to be at least one of ordered, sorted and used to present statistical analysis to the teacher via the teacher terminal during the instructional session.

11. The system of claim 7 wherein the transmitting of information utilizes a wireless network.

12. The system of claim 11 wherein the network is a wide area network including the Internet.

13. The system of claim 11 wherein the student terminals are based on thin client technology.

14. A computer program embodied on a computer readable medium for providing a teaching interface between a teacher and multiple students, comprising:
    a code segment for transmitting data from a teacher terminal to student terminals;
    a code segment for receiving the data at the student terminals;
    a code segment for separating the received data into execution data and instructional data and utilizing the execution data to display the instructional data at the student terminals;
    a code segment for grouping the student terminals into a plurality of teams, wherein each team is made up of at least two student terminals for a corresponding number of students;
    a code segment for allowing the student terminals for each team to interact to make a group decision, for encouraging team participation by shy or otherwise reluctant students;
    a code segment for transmitting team answer data from one of the student terminals for each of the teams, wherein the team answer data represents the group decision for each team;

a code segment for monitoring the team answer data for the instructional data to infer class progress toward a goal; and a code segment for allowing the teacher via the teacher terminal to modify instructional data based on the progress toward the goal.

15. The computer program of claim 14 further comprising a code segment for linking information that motivates accomplishment of the goal to the instructional data.

16. The computer program of claim 14 wherein a teacher via the teacher terminal can selectively show certain of the student data and the student interactions and analyze such student data and student interactions for each student during an instructional session.

17. The computer program of claim 16 wherein multiple students interactions are at least one of ordered, sorted and used to present statistical analysis to the teacher at the teacher terminal during the instructional session.

18. The computer program of claim 14 wherein the transmitting of data utilizes a wireless network.

19. The computer program of claim 18 wherein the student terminals are based on thin client technology.

* * * * *